US012097157B2

(12) United States Patent
Mansfield

(10) Patent No.: US 12,097,157 B2
(45) Date of Patent: *Sep. 24, 2024

(54) PATIENT SUPPORT APPARATUS WITH POWERED UNLOADING DYNAMIC WEIGH ADJUSTMENT

(71) Applicant: Stryker Corporation, Kalamazoo, MI (US)

(72) Inventor: Joshua Alan Mansfield, Lawton, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,524

(22) Filed: Jun. 28, 2023

(65) Prior Publication Data

US 2023/0338216 A1 Oct. 26, 2023

Related U.S. Application Data

(63) Continuation of application No. 17/131,934, filed on Dec. 23, 2020, now Pat. No. 11,730,652.

(Continued)

(51) Int. Cl.
*A61G 7/10* (2006.01)
*A61G 3/02* (2006.01)
*A61G 3/06* (2006.01)

(52) U.S. Cl.
CPC ......... *A61G 7/1036* (2013.01); *A61G 7/1046* (2013.01); *A61G 7/1049* (2013.01);
(Continued)

(58) Field of Classification Search
CPC ...... A61G 7/10; A61G 7/1025; A61G 7/1036; A61G 7/1046; A61G 7/1048;
(Continued)

(56) References Cited

U.S. PATENT DOCUMENTS 6,701,545 B1 3/2004 Ferneau et al.
7,389,552 B1 6/2008 Reed et al.
7,398,571 B2 7/2008 Souke et al.
8,051,513 B2 11/2011 Reed et al.
(Continued)

FOREIGN PATENT DOCUMENTS

EP 2808000 A1 * 12/2014 ............... A61G 5/04

OTHER PUBLICATIONS

U.S. Appl. No. 62/926,711, filed Oct. 28, 2019.
U.S. Appl. No. 62/926,712, filed Oct. 28, 2019.

*Primary Examiner* — David R Hare
*Assistant Examiner* — Deborah Talitha Gedeon
(74) *Attorney, Agent, or Firm* — Howard & Howard Attorneys PLLC

(57) ABSTRACT

A system for loading a patient transport apparatus into a vehicle is described. The system includes a loading and unloading system including a track and a trolley supporting a receiver movable between locked and unlocked configurations. The system also includes a patient transport apparatus for attachment to the loading and unloading system including a base, a litter, and a lift mechanism to facilitate arranging the litter at different heights relative to the base with an actuator movable between fully-retracted and fully-extended configurations, a coupler for engaging the receiver to secure the patient transport apparatus, first and second sensors configured to output a first signal and second signal and a controller to determine a target lift configuration during unloading from the emergency based on first and second values and to drive the actuator to the target lift configuration to limit relative movement between the patient transport apparatus and the trolley.

20 Claims, 27 Drawing Sheets

Related U.S. Application Data

(60) Provisional application No. 62/954,858, filed on Dec. 30, 2019.

(52) U.S. Cl.
CPC ............ *A61G 3/0218* (2013.01); *A61G 3/062* (2013.01); *A61G 2203/32* (2013.01); *A61G 2203/34* (2013.01)

(58) Field of Classification Search
CPC .. A61G 7/1049; A61G 3/0218; A61G 3/0245; A61G 3/0254; A61G 3/0272; A61G 3/029; A61G 1/06; A61G 1/0262; A61G 2203/30; A61G 2203/32; A61G 2203/34; A61G 1/0567; A61G 1/0212; A61G 2203/10; A61G 2203/40; A61G 1/0237; B60P 1/00; B60P 1/4471; B65G 67/04; B65G 67/24
See application file for complete search history.

(56) References Cited

U.S. PATENT DOCUMENTS

| | | | |
|---|---|---|---|
| 8,156,586 | B2 | 4/2012 | Reed et al. |
| 8,439,416 | B2 | 5/2013 | Lambarth et al. |
| 9,456,938 | B2 | 10/2016 | Blickensderfer et al. |
| 9,486,373 | B2 | 11/2016 | Lambarth et al. |
| 9,510,982 | B2 | 12/2016 | Valentino et al. |
| 9,789,020 | B2 | 10/2017 | Blickensderfer et al. |
| 10,098,796 | B2 | 10/2018 | Valentino et al. |
| 10,130,528 | B2 | 11/2018 | Valentino et al. |
| 10,391,013 | B2 | 8/2019 | Blickensderfer et al. |
| 10,406,046 | B2 | 9/2019 | Valentino et al. |
| 10,736,798 | B2 | 8/2020 | Valentino et al. |
| 2017/0035628 | A1 | 2/2017 | Naber et al. |
| 2018/0303685 | A1* | 10/2018 | Souke .................. A61G 1/0567 |
| 2018/0369036 | A1* | 12/2018 | Furman .................... A61G 7/16 |
| 2019/0247254 | A1 | 8/2019 | Naber et al. |
| 2019/0247257 | A1 | 8/2019 | Furman et al. |
| 2019/0336375 | A1 | 11/2019 | Blickensderfer et al. |
| 2020/0352803 | A1 | 11/2020 | Valentino et al. |
| 2021/0196546 | A1 | 7/2021 | Mansfield |

* cited by examiner

FIG. 24E
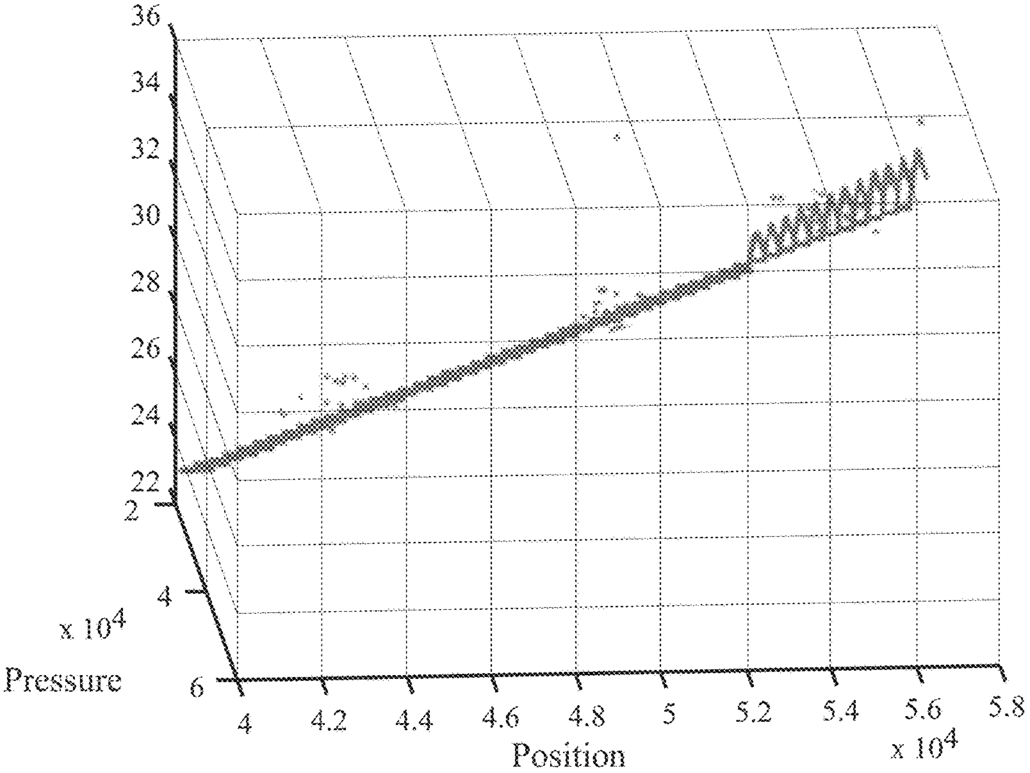
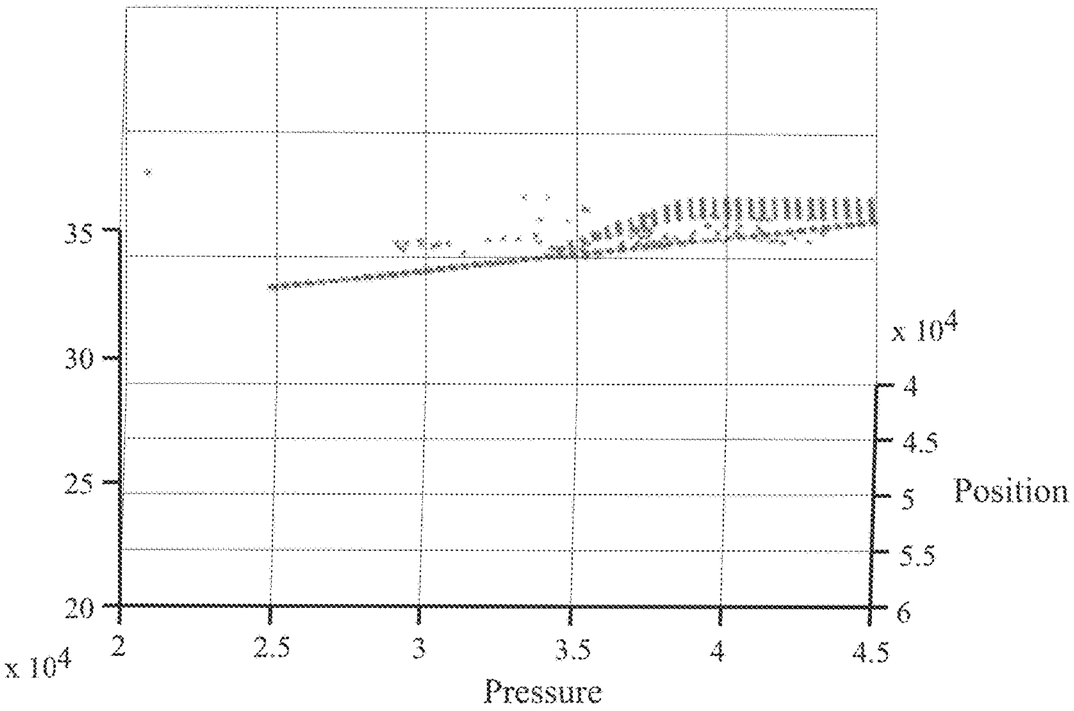
FIG. 24F

PATIENT SUPPORT APPARATUS WITH POWERED UNLOADING DYNAMIC WEIGH ADJUSTMENT

CROSS-REFERENCE TO RELATED APPLICATIONS

This application is a Continuation of U.S. patent application Ser. No. 17/131,934 filed on Dec. 23, 2020, which claims priority to and all the benefits of U.S. Provisional Patent Application No. 62/954,858 filed on Dec. 30, 2019, the disclosures of which are each incorporated by reference in their entirety.

BACKGROUND

Patient support apparatuses, such as hospital beds, stretchers, cots, tables, and wheelchairs, facilitate care of patients in a health care setting. For example, when a patient support apparatus, such as an emergency cot, is to be loaded into an emergency vehicle, such as an ambulance, the cot is moved to the rear of the emergency vehicle where it is then at least partially inserted into the compartment so that it is initially supported on one end, for example, by its head end wheels resting on the compartment floor. Alternately, the cot may be moved onto arms of a trolley, which extend from the trolley into the cot and fully support the cot, but do not interfere with the lifting mechanism. In either case, once the cot is supported (either by the head end wheels or the loading arm(s)), the base of the cot can be raised to allow the cot to then be fully loaded in to the emergency vehicle.

When unloading the cot from the emergency vehicle, as the base is lowered onto the ground surface, the weight of the patient is transferred from partially being supported by the loading arms to being fully supported by cot. Sometimes the cot may be difficult to unload from the trolley depending on how the cot was initially loaded to the trolley. When unloading the cot from the trolley, the cot may act like a giant spring causing discomfort to a patient and/or emergency personnel if the cot was not loaded into the trolley at the proper height.

A control system according to the teachings of the present disclosure is presented that helps to ensure an actuator of the cot is driven at a target configuration for unloading from the cot from the trolley such that the patient and/or emergency personnel do not experience discomfort while unloading the cot from the trolley.

BRIEF DESCRIPTION OF THE DRAWINGS

In the drawings, reference numbers may be reused to identify similar and/or identical elements.

DETAILED DESCRIPTION OF THE EMBODIMENTS

Figure 1:
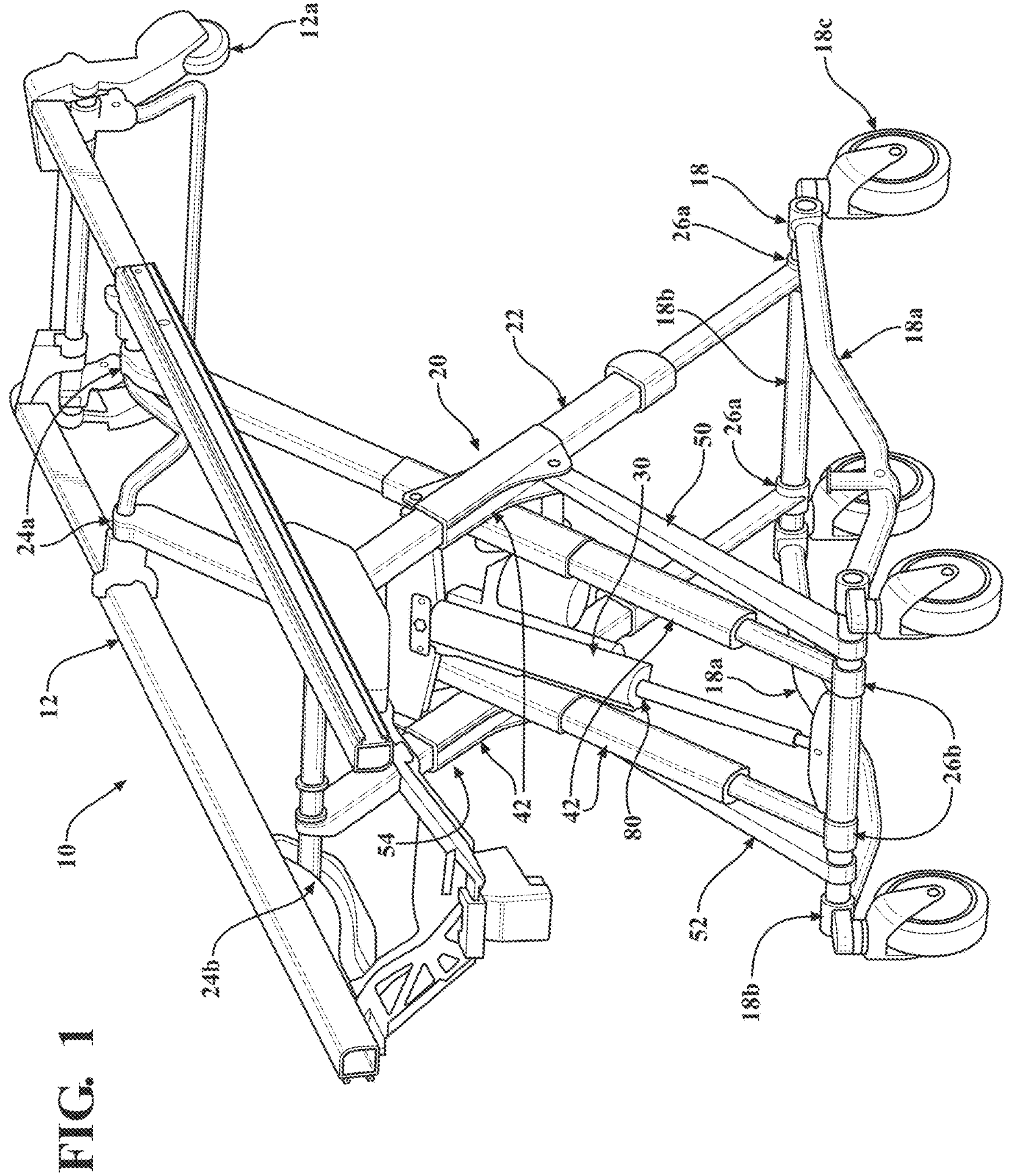
FIG. 1 is a perspective view of a patient support apparatus (with the patient support surface removed) with the lift assembly in its fully raised configuration according to the teachings of the present disclosure.

Referring to FIG. 1, is a perspective view of a patient support apparatus, such as a cot 10 is shown. Although the cot 10 is illustrated herein, the teachings of the present disclosure may be applied to any other patient support apparatus and are not limited to the cot 10. The term "patient support apparatus" is used broadly to mean an apparatus that can support a patient, such as a medical bed, including an apparatus that can transport a patient, such as an emergency cot, a stretcher, a stair chair, or other apparatuses that support and/or transport a patient. Further, the term "patient" is used broadly to include persons that are under medical treatment or an invalid, or persons who just need assistance.

Figure 2:
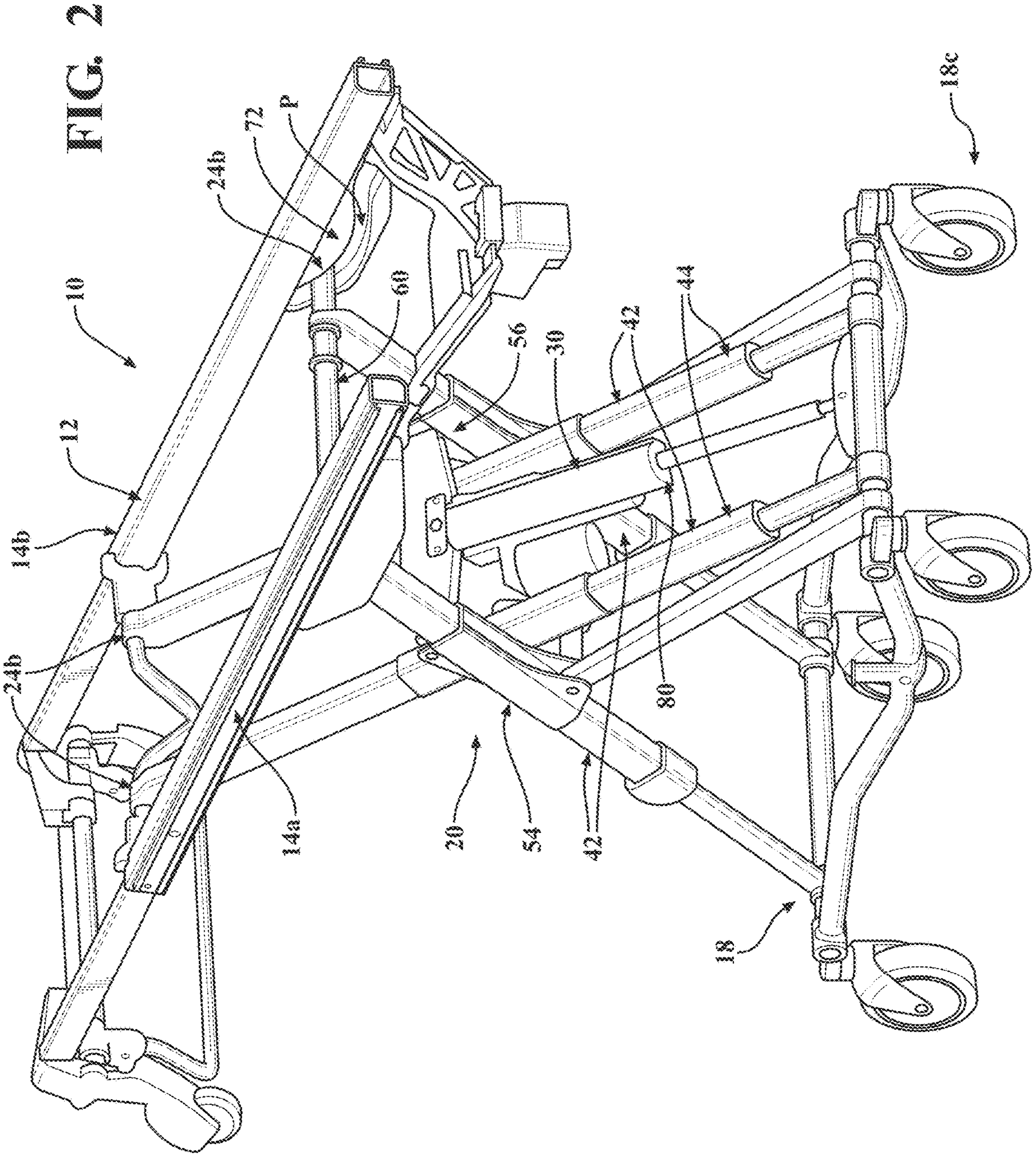
FIG. 2 is a second perspective view of the patient support apparatus of FIG. 1 according to the teachings of the present disclosure.
Figure 3:
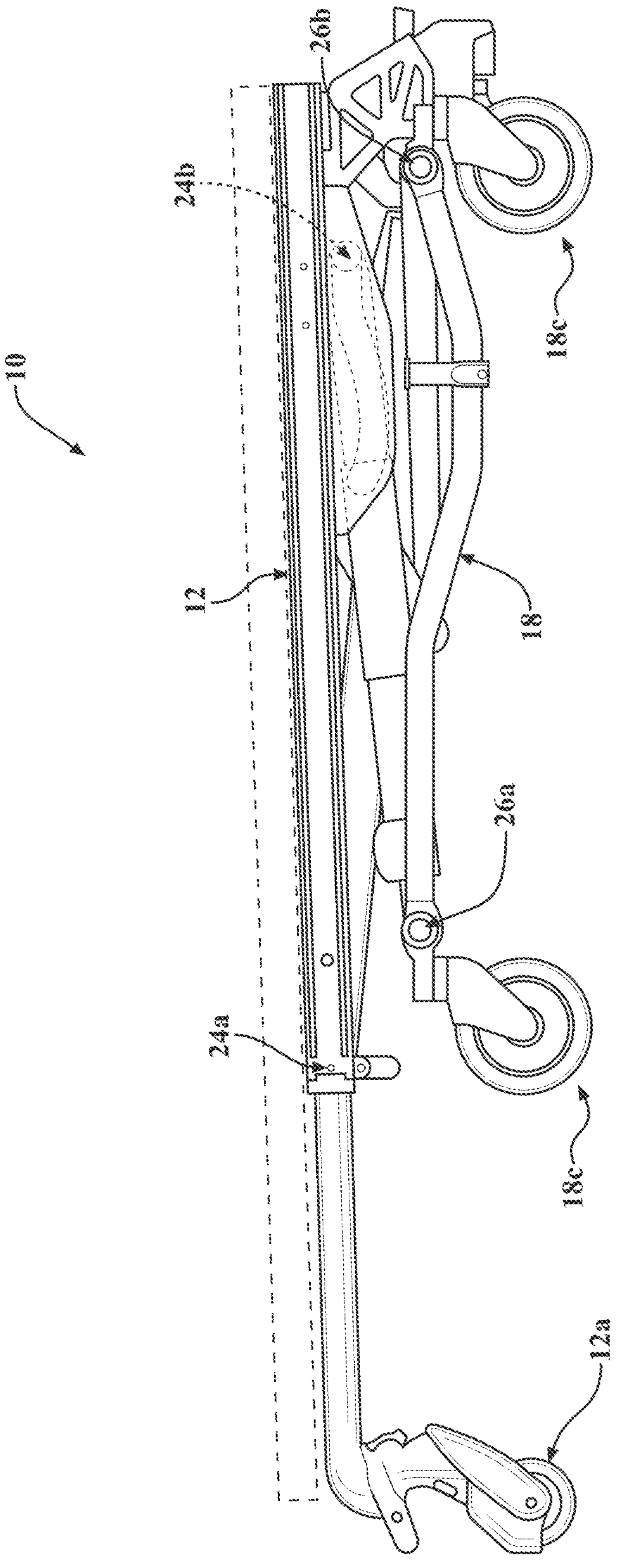
FIG. 3 is a side elevation view of the patient support apparatus in its fully lowered configuration according to the teachings of the present disclosure.
Figure 4:
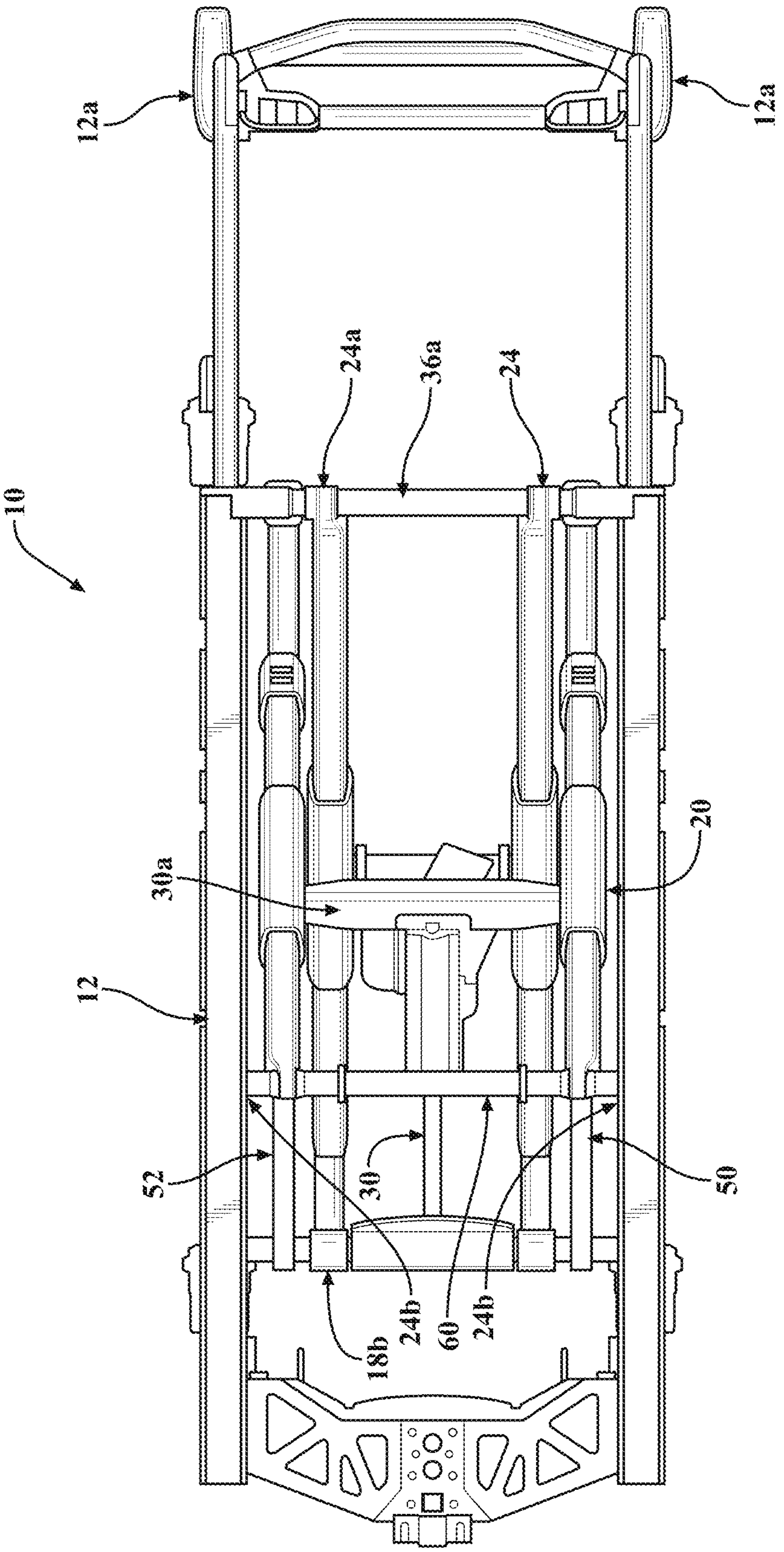
FIG. 4 is a top plan view of the patient support apparatus of FIG. 3 according to the teachings of the present disclosure.

With additional reference to FIGS. 2 and 3, the cot 10 includes a frame 12, which in the illustrated embodiment comprises a litter frame that supports a litter deck (shown in phantom in FIG. 3), which provides a patient support surface, and a base 18. As will be more fully described below, the cot 10 includes a lift assembly 20 that raises or lowers the base 18 or the frame 12 with respect to the other so that the cot 10 can be rearranged between a more compact configuration, for example, for loading into an emergency vehicle, such as an ambulance, and a configuration for use in transporting a patient across a ground surface.

Referring again to FIG. 1, the frame 12 is mounted to the base 18 by lift assembly 20, which includes load bearing members 22 pivotally coupled to the frame 12 and to the base 18. In the illustrated embodiment, load bearing members 22 are pivotally coupled to the frame 12 by head-end upper pivot connections 24*a* and foot-end upper pivot connections 24*b*.

In the illustrated embodiment, each load bearing member 22 comprises a telescoping compression/tension member 42. The telescoping compression/tension members 42 may be pivotally joined at their medial portions about a pivot axis to thereby form a pair of X-frames 44 (FIG. 2). The upper ends of each X-frame 44 are, therefore, pivotally mounted to the frame 12 by head-end upper pivot connections 24*a* and foot-end upper pivot connections 24*b*. The lower ends of each X-frame 44 are pivotally mounted to the base 18 by head-end lower pivot connections 26*a* and foot-end lower pivot connections 26*b*. However, it should be understood that other configurations are contemplated. In some embodiments, lift assemblies may be similar to as is disclosed in U.S. Pat. No. 7,398,571, entitled "Ambulance cot and hydraulic elevating mechanism therefor," and/or in U.S. Pat. No. 9,486,373, entitled "Reconfigurable patient support," the disclosures of each of which are hereby incorporated by reference in their entirety. Other configurations are contemplated.

In addition to load bearing members 22, the cot 10 includes a pair of linkage members 50 and 52 (FIG. 1), which are pivotally mounted on one end to transverse frame members 18*b* of base 18 and on their other ends to brackets 54, 56 (FIG. 1), which mount to the X-frames and also provide a mount for an actuator 30 (FIG. 1, e.g., a linear actuator), which extends or contracts the lift assembly 20 to raise or lower the frame 12 relative to the base 18 (or raise or lower the base 18 relative to the frame 12) as described below. Brackets 54 and 56 pivotally mount the linkage members 50 and 52, as well as the actuator 30 (described below), to the X-frames 44 (FIG. 2) so that linkage members 50 and 52 provide a timing link function as well as a moment coupling function. It should be understood that multiple actuators may be used to raise or lower frame 12.

Figure 5:
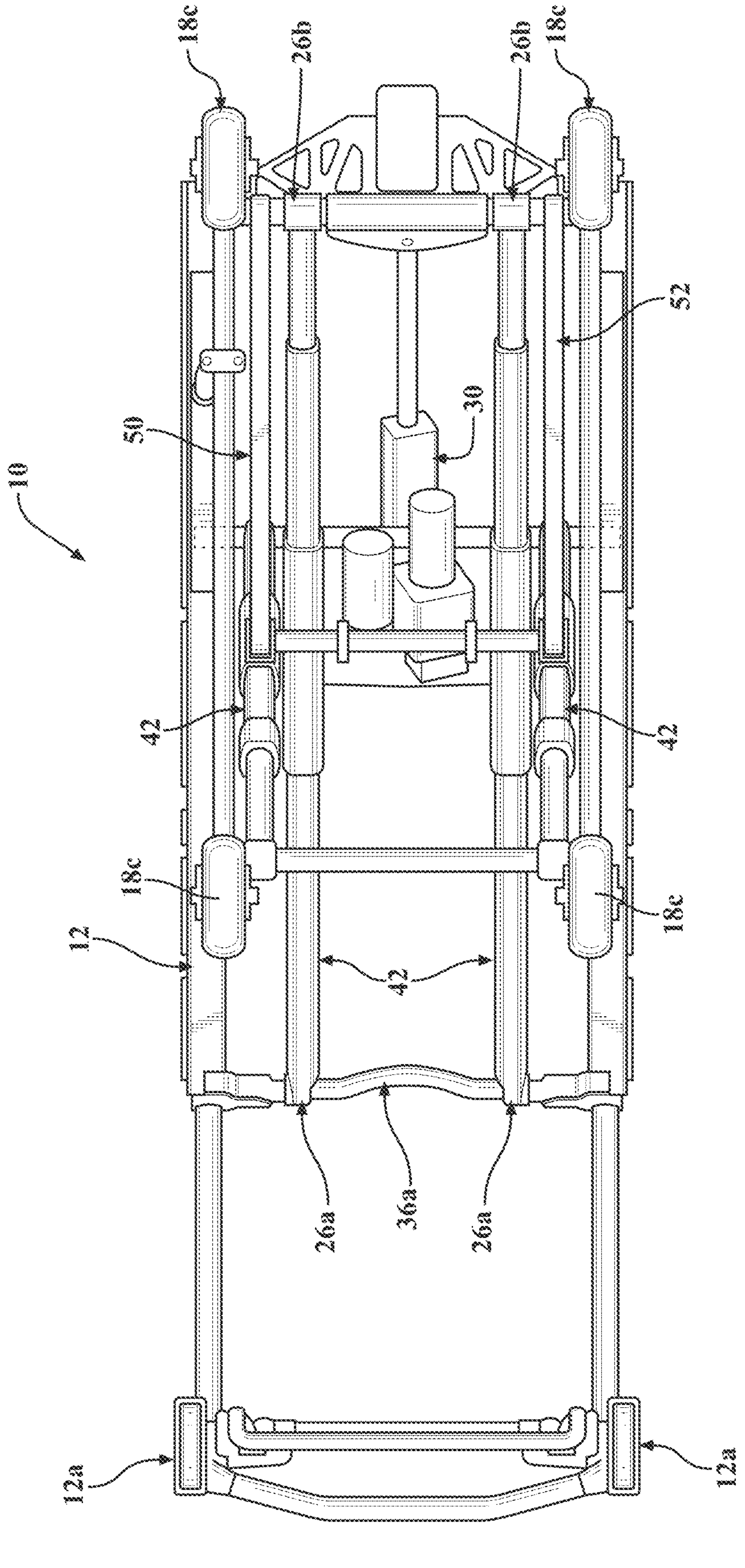
FIG. 5 is a bottom plan view of the patient support apparatus of FIG. 3 according to the teachings of the present disclosure.

As best seen in FIG. 1, base 18 is formed by longitudinal frame members 18*a* and transverse frame members 18*b*, which are joined together to form a frame for base 18. Mounted to the longitudinal frame members 18*a* are bearings, such as wheels 18*c* or castors. Transverse frame members 18*b* provide a mount for the head end and the foot-end lower pivot connections 26*a*, 26*b* (FIGS. 3 and 5) of load bearing members 22, and also for the rod end of the actuator 30. As described above, the upper end of actuator 30 is mounted between the X-frames 44 (formed by load bearing members 22) by a transverse member 30*a* that is mounted to brackets 54, 56.

As noted above, the lift assembly 20 is extended or contracted by actuator 30. In the illustrated embodiment, actuator 30 comprises a hydraulic system 60 including a hydraulic cylinder 80, which is controlled by a control system 82. Although one actuator 30 is illustrated, it should be understood that more than one actuator or cylinder may be used. As will be more fully described below, control system 82 includes a hydraulic circuit 90 and a controller 120, which is in communication with hydraulic circuit 90 and user interface 120*a* that allows an operator to select between the lifting, lowering, and raising functions described herein. For example, the user interface 120*a* may include one or more user interface controls such as a touch screen with touch screen areas or may comprise a key pad with push buttons, such as directional buttons, or switches, such as key switches, that correspond to the lifting, lowering, raising, and retracting functions described herein to allow the user to select the mode of operation and generate input signals to controller 120. As will be more fully described below, the controller 120 may also automatically control the mode of operation.

Figure 6:
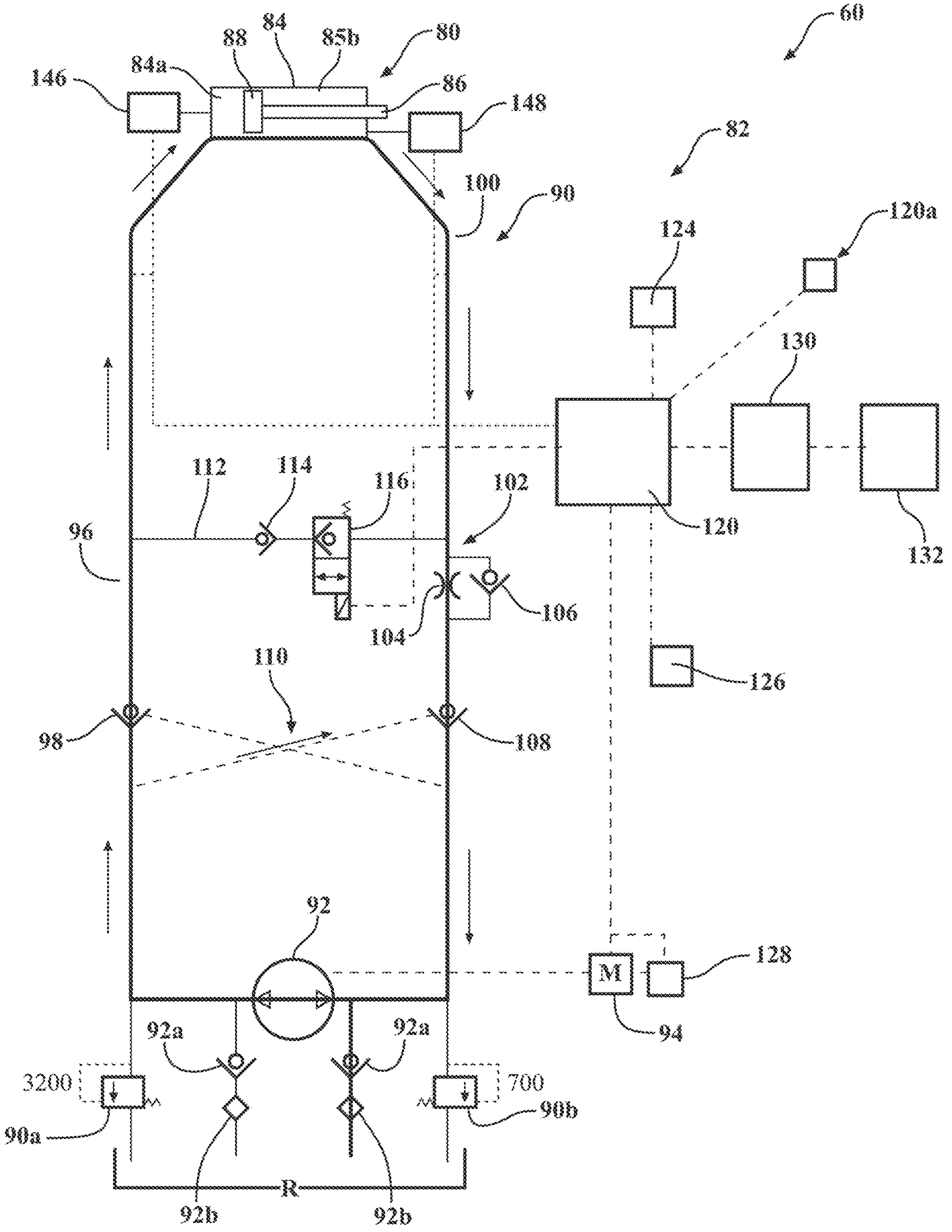
FIG. 6 is a hydraulic circuit diagram of the hydraulic system and control system in one embodiment of the patient support apparatus illustrating the flow of hydraulic fluid in the lifting or raising mode of the frame relative to the base of the patient support apparatus when the base is supported on a ground surface according to the teachings of the present disclosure.
Figure 7:
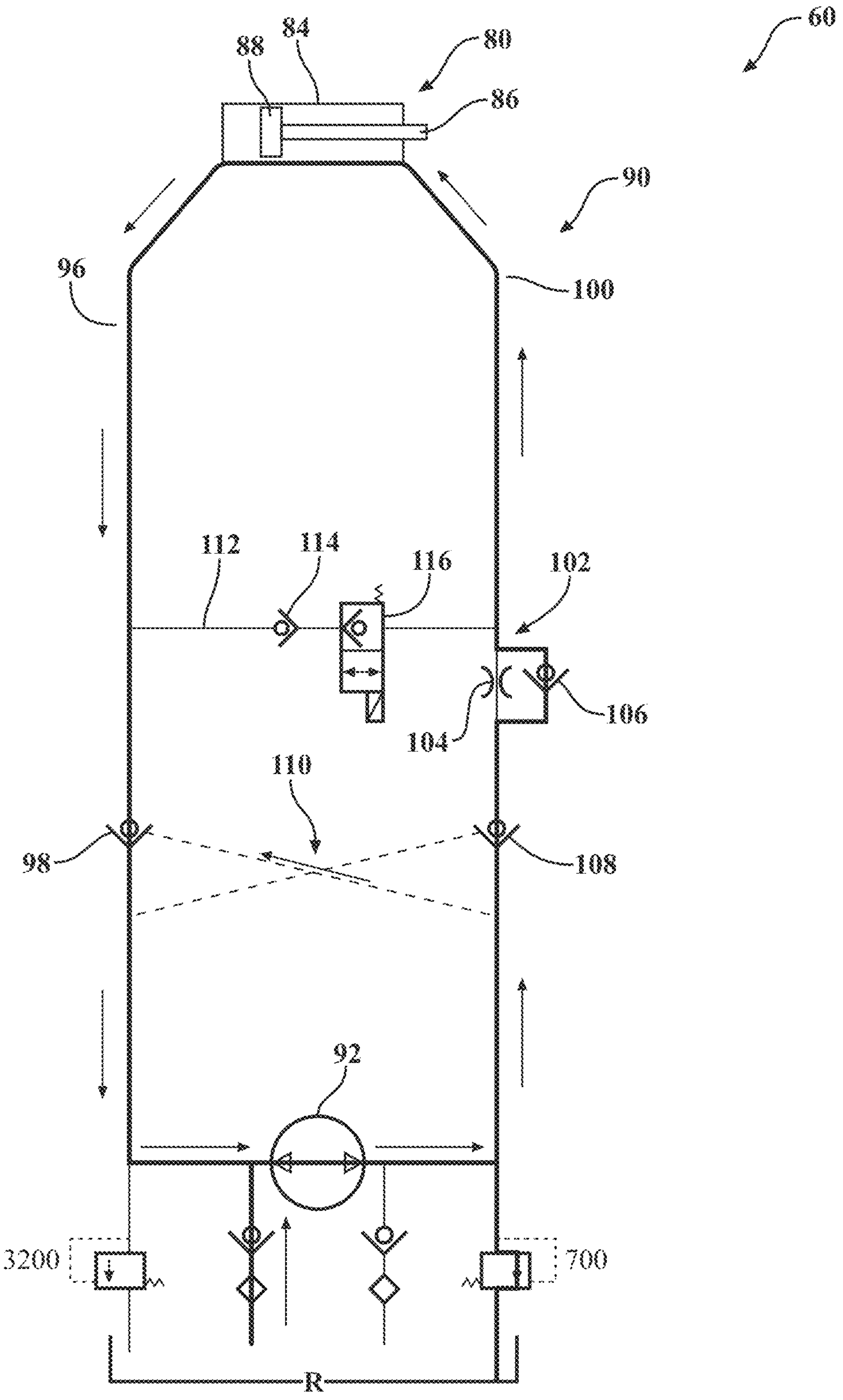
FIG. 7 is the hydraulic circuit diagram of FIG. 6 illustrating the flow of hydraulic fluid in the raising or retracting mode of the base of the patient support apparatus when the frame is raised and supported by an emergency vehicle according to the teachings of the present disclosure.
Figure 8:
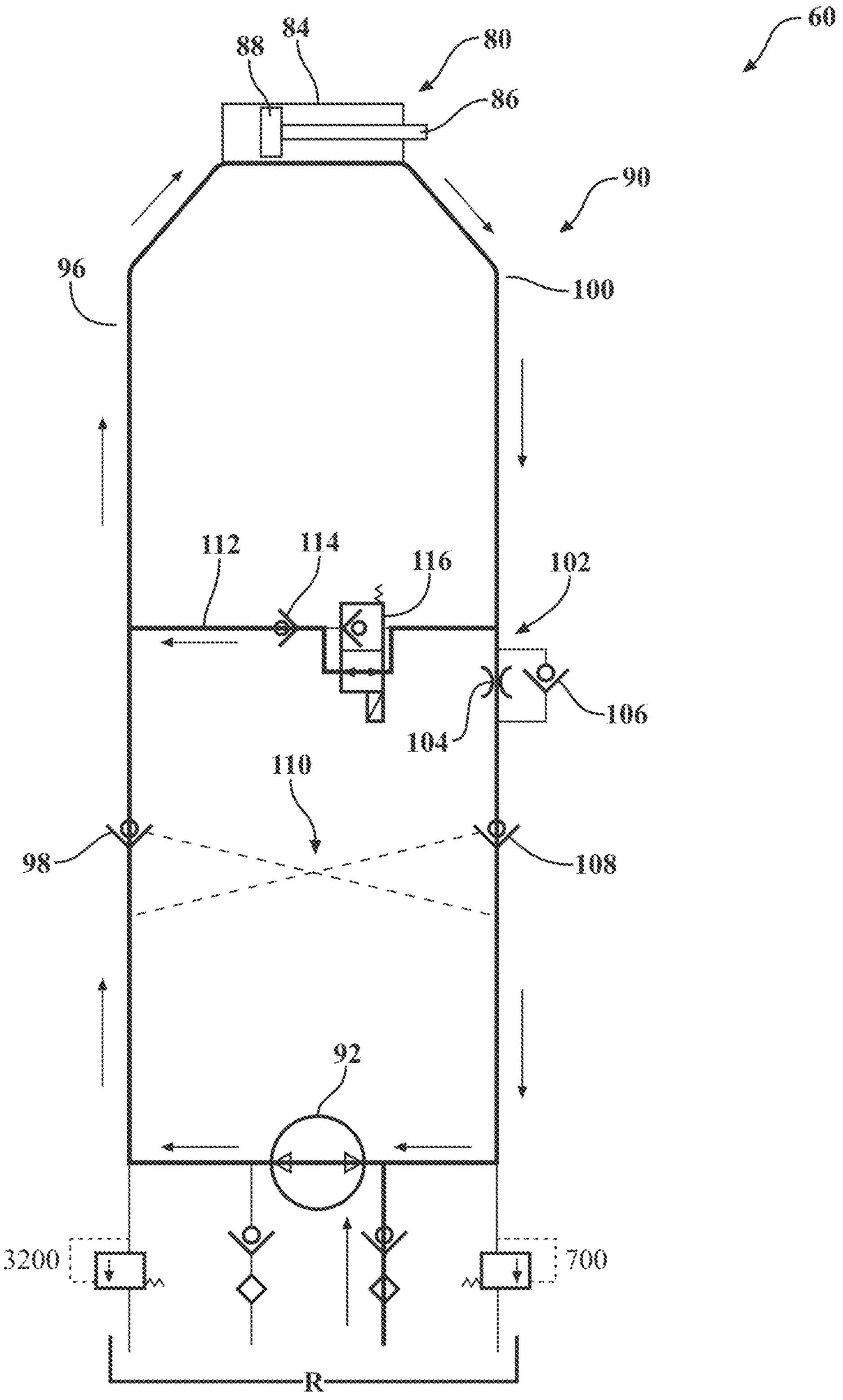
FIG. 8 is the hydraulic circuit diagram of FIG. 6 illustrating the flow of hydraulic fluid in the lowering mode of the base of the patient support apparatus when the patient support apparatus is in a compact configuration and the frame is supported by an emergency vehicle according to the teachings of the present disclosure.

Referring to FIGS. 6-8, the hydraulic cylinder 80 includes a cylinder housing 84 with a reciprocal rod 86. Mounted at one end of the reciprocal rod 86 is a piston 88, which is located within the cylinder housing 84. The distal end of the reciprocal rod 86 is extended from cylinder housing 84 and connected in a conventional manner to transverse frame member 18*b* of base 18. As described above, the other end or fixed end (or cap end) of the hydraulic cylinder 80 is mounted between brackets 54, 56.

The hydraulic cylinder 80 is extended or retracted by control system 82 to extend or contract lift assembly 20 and generally operates in four modes, namely (first mode) to raise the frame 12 when base 18 is supported on, for example, a ground surface (FIG. 6), (second mode) to lower the frame 12 when base 18 is supported on, for example, a ground surface (FIG. 7), (third mode) to lower or extend base 18 when the cot 10 is in its loading (compact) configuration and when the frame 12 is supported, for example, by an attendant or a loading and unloading apparatus (FIG. 8), or (fourth mode) to raise base 18 when the frame 12 is supported, for example, by an attendant or a loading and unloading apparatus (FIG. 7) and when the cot 10 is in its transport (raised) configuration to reconfigure the apparatus into its loading (compact) configuration. As will be more fully described below, when lowering base 18 relative to frame 12 (when frame 12 is supported) control system 82 is configured to automatically lower or extend base 18 at a faster speed unless certain conditions exist.

Referring to FIGS. 6-8, the hydraulic circuit 90 includes a pump 92, which is in fluid communication with a fluid reservoir or reservoir R, to pump fluid from the reservoir R to the hydraulic cylinder 80. As best seen in FIG. 6. when a user selects the first mode of operation (e.g. via the user interface 120*a*) to raise or lift the frame 12, the controller 120 powers the motor 94, which operates pump 92 to pump fluid from the reservoir R, through filters 92*b* and check valves 92*a*, into the hydraulic circuit 90 to direct the flow of fluid to the hydraulic cylinder 80. To avoid over pressurization, for example, when a heavy patient is supported on frame 12, fluid may be discharged from the hydraulic circuit 90, for example, when the pressure in the hydraulic circuit 90 exceeds a designated pressure (e.g. 3200 psi on the cap side of the hydraulic circuit, and 700 psi on the rod side of the hydraulic circuit), through pressure relief valves 90*a* and 90*b*. It is to be understood that the pump 92, the hydraulic cylinder 80, and the various conduits carrying hydraulic fluid to the hydraulic cylinder 80 are typically always filled with hydraulic fluid. Pump 92 is driven by a motor 94 (both of which are optionally reversible) which may be electric and controlled by controller 120 to thereby control the pump 92.

Referring again to FIG. 6, when an operator wishes to raise frame 12 relative to base 18 (first mode), and base 18 is supported on a support surface, the operator, using the user interface 120*a* (FIG. 6), generates input signals that are communicated to controller 120. When operating in the first mode, the output of the pump 92 (in the direction indicated by the arrows in FIG. 6) will supply hydraulic fluid through a first hydraulic conduit 96 to the cap end chamber 84*a* of the cylinder housing 84, which is on the piston side of the reciprocal rod 86. The first hydraulic conduit 96 includes a pilot operated check valve 98 that is opened when fluid flows to the cap end chamber 84*a* and closed when fluid to the cap end chamber 84*a* stops to retain the pressure in the cap end chamber 84*a* until it is opened by the pilot signal received from the other side of the hydraulic circuit 90 (a second pilot operated check valve 108 described below) to allow the flow fluid from the cap end chamber 84*a* of cylinder in the reverse direction when the reciprocal rod 86 is being retracted.

When fluid is directed to cap end chamber 84*a*, the reciprocal rod 86 will extend to raise the frame 12 relative to base 18 at a first speed. This mode of operation is used when base 18 is supported on a support surface, such as the ground, which can be detected by the controller 120 in various ways described below. It should be understood that the first mode may also be used to lower or extend base 18 when the faster speed of the third mode described below is not appropriate or desired.

Referring to FIG. 7, when an operator user wishes to select the second mode or the fourth mode, that is to lower the frame 12 relative to base 18 (when base 18 is supported on a support surface) or raise base 18 relative to frame 12 (when frame 12 is supported), using the user interface 120*a*, the operator will generate an input signal to controller 120 that will cause the controller 120 to operate in the second mode or the fourth mode. In the second mode or the fourth mode, the direction of pump 92 is reversed, so that fluid will flow in an opposite direction (see arrows in FIG. 7) to the hydraulic cylinder 80 through a second hydraulic conduit 100, which is in fluid communication and connected to the rod end chamber 84*b* of the cylinder housing 84. The second hydraulic conduit 100 includes a check valve assembly 102, with an orifice or fluid throttle 104 and a poppet or check valve 106 in parallel, to control the flow of fluid through the second hydraulic conduit 100. Fluid flow in this direction will cause the reciprocal rod 86 to retract and raise the base 18 when the frame 12 is supported or lower the frame 12 relative to base 18 when the base 18 is supported.

Also provided is the second pilot operated check valve 108 connected between the check valve assembly 102 and pump 92. Optionally, valves 98 and 108 are provided as a dual pilot operated check valve assembly 110, which includes both piloted operated check valves (98 and 108) and allows fluid to flow through each respective conduit in either direction. The valves 98 and 108 of the dual pilot operated check valve assembly 110 are operated by the fluid pressure of the respective branch of the first and second hydraulic conduits (96 or 100) as well as the fluid pressure of the opposing branch of the first and second hydraulic conduits (96 or 100), as schematically shown by the dotted lines in FIGS. 6-8.

Referring to FIG. 8, when an operator selects the base 18 lowering function and the litter is supported (and the base is unsupported), controller 120 will automatically increase the speed of the hydraulic cylinder 80 over the first speed (the third mode). As would be understood by those skilled in the art, the speed of the hydraulic cylinder 80 may be increased by increasing the flow of hydraulic fluid and/or pressure of the hydraulic fluid flowing to the cylinder(s) unless certain conditions exist. Optionally, the user interface 120*a* may allow an operator to generate an input signal to select the third mode and/or to disable the third mode.

In order to speed up the extension of the reciprocal rod 86 when operating in the third mode, hydraulic circuit 90 includes a third hydraulic conduit 112, which is in fluid communication with the first and second hydraulic conduits 96 and 100 via a check valve 114, to thereby allow fluid communication between the cap end chamber 84*a* and the rod end chamber 84*b* and to allow at least a portion of the fluid output from the rod end chamber 84*b* to be redirected to the cap end chamber 84*a*, which increases the speed of the reciprocal rod 86 (i.e. by increasing the pressure and/or fluid flow of the fluid delivered to the cap end chamber 84*a*).

To control (e.g. open and close) fluid communication between the cap end chamber 84*a* and rod end chamber 84*b* via the third hydraulic conduit 112, the third hydraulic conduit 112 includes a valve 116, such as a solenoid valve or a proportional control valve, which is normally closed but selectively controlled (e.g. opened) to open fluid communication between the rod end chamber 84*b* and the cap end chamber 84*a* as described below. As noted, this will allow at least a portion of the fluid output from the rod end chamber 84*b* to be redirected to the cap end chamber 84*a* to thereby increase the speed of the reciprocal rod 86. Optionally, an additional valve, (not shown) such as a solenoid valve, may be included in the second hydraulic conduit 100, for example, between the third hydraulic conduit 112 and pump 92, which is normally open but can be selectively controlled (e.g. closed), so that the amount of fluid (and hence fluid pressure and/or fluid flow) that is redirected from the rod end chamber 84*b* may be varied. For example, all the fluid output from rod end chamber 84*b* may be redirected to the cap end chamber 84*a*. In another embodiment, an additional electrically operated proportional control valve may be used in any of the branches of the first, second, or third hydraulic conduits (e.g. 96, 100, or 112) to control the rate of fluid flow through the respective conduits and thereby control and vary the speed of the extension of the reciprocal rod 86.

Referring again to FIG. 6, the controller 120 may be in communication with one or more sensors, which generate input signals to controller 120 (or controller 120 may detect the state of the sensor) to allow controller 120 to adjust the hydraulic circuit 90 based on an input signal or signals from or the status of the sensors, described more fully below. Suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like.

For example, the controller 120 may control (e.g. open or close) the valve 116 to increase or stop the increased speed of the hydraulic cylinder 80 and/or slow or stop the pump 92 to slow or stop the hydraulic cylinder 80, or any combination thereof based on an input signal or signals from or the status of the sensor(s). Further, the controller 120 may control (e.g. close) the valve 116 before, after, or at the same time as slowing or stopping the pump 92 based on an input signal or signals from or the status of the sensor(s). Alternately, controller 120 may slow, increase the speed of, or stop the pump 92 in lieu of controlling (e.g. dosing) the valve 116 based on an input signal or signals from or the status of the sensor(s). For example, when there is no weight sensed on the base 18, the motor 94 may be configured to drive the pump 15 at a higher speed (e.g. by increasing the motor pulse width modulation (PWM)) to generate higher fluid flow and pressure. Operation of the pump 92, controller 120, as well as other systems and/or components may be similar to as is disclosed in U.S. patent application Ser. No. 17/081,593 which is based on and claims priority to U.S. Provisional Patent Application No. 62/926,711, titled "Hydraulic Valve and System" and filed on Oct. 28, 2019, and/or similar to as is disclosed in U.S. patent application Ser. No. 17/081,608 which is based on and claims priority to U.S. Provisional Patent Application No. 62/926,712, titled "Hydraulic Circuit for a Patient Support Apparatus," the disclosures of each of which are hereby incorporated by reference in their entirety. Other configurations are contemplated.

In some embodiments, the control system 82 may include one or more sensors to detect when the base 18 of the cot 10 is contacting the ground or other surface, such as a bumper or another obstruction, which, as noted, may be used as an input signal or signals to the controller 120 to control the hydraulic circuit 90. Here, similar control systems 82 and/or sensors are disclosed in U.S. patent application Ser. No. 17/081,608, previously referenced. Suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like. Other configurations are contemplated.

Further, in addition, or alternately, control system 82 may include one or more of the position sensors 124 (FIG. 6) that detect the height of the cot 10. Similarly, suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or the like. Here, aspects of the sensors, control system 82, and/or other components of the cot 10 may be similar to as is described in U.S. patent application Ser. No. 15/949,648, entitled "Patient Handling Apparatus with Hydraulic Control System," and/or as is described in U.S. patent application Ser. No. 16/271,117, entitled "Techniques for Determining a Pose of a Patient Transport Apparatus," the disclosures of each of which are hereby incorporated by reference in their entirety. Other configurations are contemplated.

In yet another embodiment, control system 82 may include one or more sensors 126 (FIG. 6) that detect the configuration of the cot 10. For example, similar to a position sensor 124 noted above, transducers (see above for list of suitable transducers or sensors) may be placed at different locations about the cot 10 that detect magnets also placed at different locations about the cot 10. In this manner, when a magnet is aligned with the transducer (or one of the transducers), the magnet field will be detected by that transducer, which the transducer then generates a signal or signals that indicate that the cot 10 is in a defined configuration or height (associated with the location of that transducer) of the cot 10.

The number of configurations may be varied—for example, a single sensor may be provided to detect a single configuration (e.g. fully raised configuration or a fully lowered configuration) or multiple sensors may be used to detect multiple configurations, with each transducer detecting a specific configuration. Again, the sensors can create an appropriate input signal to the controller 120 that is indicative of the configuration of the cot 10. Control systems 82 that are similarly configured to employ, define, or otherwise utilize safe transport height features are described in U.S. patent application Ser. No. 16/271,114, entitled "Patient Transport Apparatus with Defined Transport Height," the disclosure of which is hereby incorporated by reference in its entirety.

Further, when multiple configurations are detected, controller 120 may compare the detected configuration of cot 10 to a prescribed configuration and, in response, control the hydraulic circuit 90 based on whether the cot 10 is in or near a prescribed configuration or not. Or when only a single configuration is detected, controller 120 may simply use the signal from the sensor as an input signal and control the hydraulic circuit 90 based on the input signal.

When the cot 10 is no longer in the prescribed configuration (e.g. by comparing the detected configuration to a prescribed configuration stored in memory or detecting that it is not in a prescribed configuration), controller 120 may be configured to open or reopen the valve 116 to allow the hydraulic cylinder 80 to operate at its increased speed but then close valve 116 when controller 120 detects that cot 10 is in a prescribed configuration and/or, further, may slow or stop the motor 94 to stop the pump 92 or reverse the motor 94.

For example, one of the prescribed configurations may be when the lift assembly 20 is in its transport or fully raised configuration. In this manner, similar to the previous embodiment, when the controller 120 detects that the cot 10 is near or in its fully raised configuration, the controller 120 may be configured to close valve 116 so that the hydraulic cylinder 80 can no longer be driven at the increased speed, and further may also stop the motor 94 to stop pump 92. As noted above, the controller 120 may open or close the valve 116 before, after, or at the same time as stopping the pump 92 (or reversing the motor 94) based on the input signal or signals from or the status of the sensor(s). Alternately, controller 120 may stop the pump 92 in lieu of closing the valve 116 based on an input signal or signals from or the status of the sensor(s).

In yet another embodiment, the control system 82 may include a sensor 128 (FIG. 6), which is in communication with controller 120, to detect when a load on the motor 94 (or on the pump 92) occurs. For example, the sensor 128 may detect current drawn by the motor 94. In this manner, using sensor 128, the controller 120 can detect when the base is supported on a surface, such as the ground or the deck of the emergency vehicle, by detecting when the motor 94 or pump 92 encounter increased resistance, for example, by detecting the current in the motor 94. As would be understood, this increased resistance would occur when the base 18 is either supported or encounters an obstruction. Further, the controller 120 may be configured to detect when the load has exceeded a prescribed value (e.g. by comparing the detected load to a store load value in memory), and optionally close valve 116 to no longer allow fluid communication between the rod end chamber **84*b* and the cap end chamber 84*a* via the third hydraulic conduit 112 when the load has exceeded the prescribed value. As noted above, controller 120 may open or close the valve 116 before the load reaches the prescribed value and further before, after, or at the same time as slowing or stopping the pump 92 based on an input signal or signals from or the status of the sensor(s). As noted above, the controller 120 may also reverse the motor 94 before, after or at the same time it closes valve 116. Alternately, controller 120 may slow or stop the pump 92 in lieu of closing the valve 116** based on an input signal or signals from or the status of the sensor(s).

For example, if an attendant is removing the cot 10 from an emergency vehicle and has selected the base lowering function, and while the base 18 is being lowered at the increased speed, the controller 120 detects that the motor 94 or pump 92 is under an increase in load (e.g. detects an increase in current) (which, as noted, would occur when the base 18 is supported, either by a support surface or an obstruction) the controller 120 may close valve 116 so that the hydraulic cylinder 80 will no longer be driven at the increased speed. Optionally, controller 120 may also or instead slow or stop the pump 92 and/or stop the pump 92 before closing the valve 116. Alternately, controller 120 may simultaneously close the valve 116 and slow or stop the pump 92. As described above, in yet another embodiment, controller 120 may close the valve 116 prior to base 18 being supported (for example, when the frame 12 or base 18 reaches a prescribed height or when the cot 10 has a prescribed configuration) and only after controller 120 detects that base 18 has contacted the ground surface and/or the base 18 is fully lowered, the controller 120 will stop the pump 92 so that the hydraulic cylinder 80 will no longer extend or the controller 120 may be configured to stop the pump 92 before the base 18 reaches the ground to avoid overshoot.

The controller 120 may also receive signals indicative of the presence of the cot 10 near an emergency vehicle. For example, a transducer may be mounted to the cot 10 and a magnet may be mounted to the emergency vehicle and located so that when the cot is near the emergency vehicle, the transducer will detect the magnet and generate a signal based on its detection. In this manner, when an operator has selected the base extending (e.g. lowering) function and controller 120 detects that cot 10 is near an emergency vehicle and, further, detects one or more of the other conditions above (e.g. that the base 18 is not contacting a support surface or there is no load on the motor 94 or pump 92 or the cot 10 is not in a prescribed configuration), controller 120 may open valve 116 to allow the cylinder to be driven at the increased speed. In this manner, these additional input signals may confirm that the situation is consistent with a third mode of operation.

Alternately, controller 120 may also receive signals indicative of the presence of the cot 10 in an emergency vehicle. For example, a transducer may be mounted to the cot 10 and a magnet may be mounted to the emergency vehicle and located so that when the cot is in the emergency vehicle, the transducer will detect the magnet and generate a signal based on its detection. In this manner, when an operator has selected the base lowering function and controller 120 detects that cot 10 is in the emergency vehicle and detects one or more of the other conditions above (e.g. that the base 18 is not contacting a support surface or there is no load on the motor 94 or pump 92 or the cot 10 is not in a prescribed configuration), the signal indicating that cot 10 is in the emergency vehicle will override the detection of the other conditions and the controller 120 may maintain valve 116 closed to prevent the cylinder from being driven at the increased speed and, further, override the input signal generated by the operator. Details regarding sensing the proximity to or location in an emergency vehicle are described in U.S. patent application Ser. No. 14/998,028, entitled "Patient Support," the disclosure of which is hereby incorporated by reference in its entirety. Other configurations are contemplated.

In yet another embodiment, the cot 10 may include a cot-based communication system 130 (FIG. 6) for communicating with a loading and unloading based communication system 132 (FIG. 6) on a loading and unloading apparatus. For example, the communication system 130, 132 may be wireless, such as RF communication systems (including near-field communication systems). For example, the control system 82 may be operable to open or close the valve 116 based on a signal received from the loading and unloading based communication system 132. In this manner, the deployment of the base of the cot 10 may be controlled by someone at the loading and unloading apparatus or someone controlling the loading and unloading apparatus.

In one embodiment, rather than allowing controller 120 to start in the third mode (when all the conditions are satisfied), the controller 120 may be configured to initially start the base lowering function in the first mode, where the base is lowered at the slower, first speed. Only after the controller 120 has checked that there is a change in the load (e.g. by checking a sensor, for example a load cell or current sensing sensor) on the motor 94 or cot 10 to confirm that the motor 94 or the pump 92 are now under a load (which would occur once the apparatus is pulled from the emergency vehicle and the base 18 is being lowered), does the controller 120 then switch to the third mode to operate the hydraulic cylinder 80 at the faster, second speed. Again, once operating in the third mode, should the controller 120 detect one or more of the conditions noted above (base 18 is supported or encounters an obstruction, the height exceeds a prescribed height, the configuration is in a prescribed configuration, the load on the motor 94 or pump 92 exceeds a prescribed value) the controller 120 will close valve 116 and optionally further slow or stop pump 92. As noted above, the valve 116 may be closed by the controller 120 after the pump 92 is slowed or stopped or simultaneously.

In any of the above embodiments, it should be understood that control system 82 can control the hydraulic circuit 90 to slow or stop the extension of the reciprocal rod 86 of the hydraulic cylinder 80, using any of the methods described above, before the conditions noted above, such as before reaching a predetermined height, before reaching a predetermined configuration, before making contact with the ground or an obstruction, or before reaching a prescribed load on the motor, etc. Further, control of the fluid through the hydraulic circuit 90 may be achieved by controlling the flow rate or opening or closing the flow using the various valves noted above that are shown and/or described. Further, as noted to avoid excess pressure in the hydraulic circuit 90, the controller 120 may reverse the motor 94 when controlling the valves described herein or may slow or stop the motor 94 and the pump 92 before reaching the target (e.g. maximum height). Additionally, also as noted, controller 120 may control the hydraulic circuit 90 by (1) adjusting the flow control valves or valves (e.g. valve 116), (2) adjusting the pump 92 (slow down or stop) or (3) adjusting both the flow control valves or valves (e.g. valve 116) and the pump 92, in any sequence.

Referring to FIGS. 9-17, the cot 10 may be configured for use with an ambulance cot loading and unloading system 140. The ambulance cot loading and unloading system 140 includes a loading and unloading apparatus 142, which is configured for mounting in the cargo area 144 of an ambulance 146. As will be more fully described below, loading and unloading apparatus 142 is configured to assist in the loading or unloading of the cot 10 into or out of ambulance 146 by providing cantilevered support to the cot 10 either before the cot 10 is loaded into the ambulance so that as soon as the cot 10 is engaged and lifted by the loading and unloading apparatus 142 the collapsible legs or base of the cot 10 can be folded and the cot 10 loaded into the ambulance or when the cot 10 is being unloaded. By cantilevered support it is meant that an attendant need not provide any significant vertical support to the cot 10 and instead need only simply guide and push or pull the cot 10 into or out of the ambulance 146 once it is supported by the loading and unloading apparatus 142.

Figure 9:
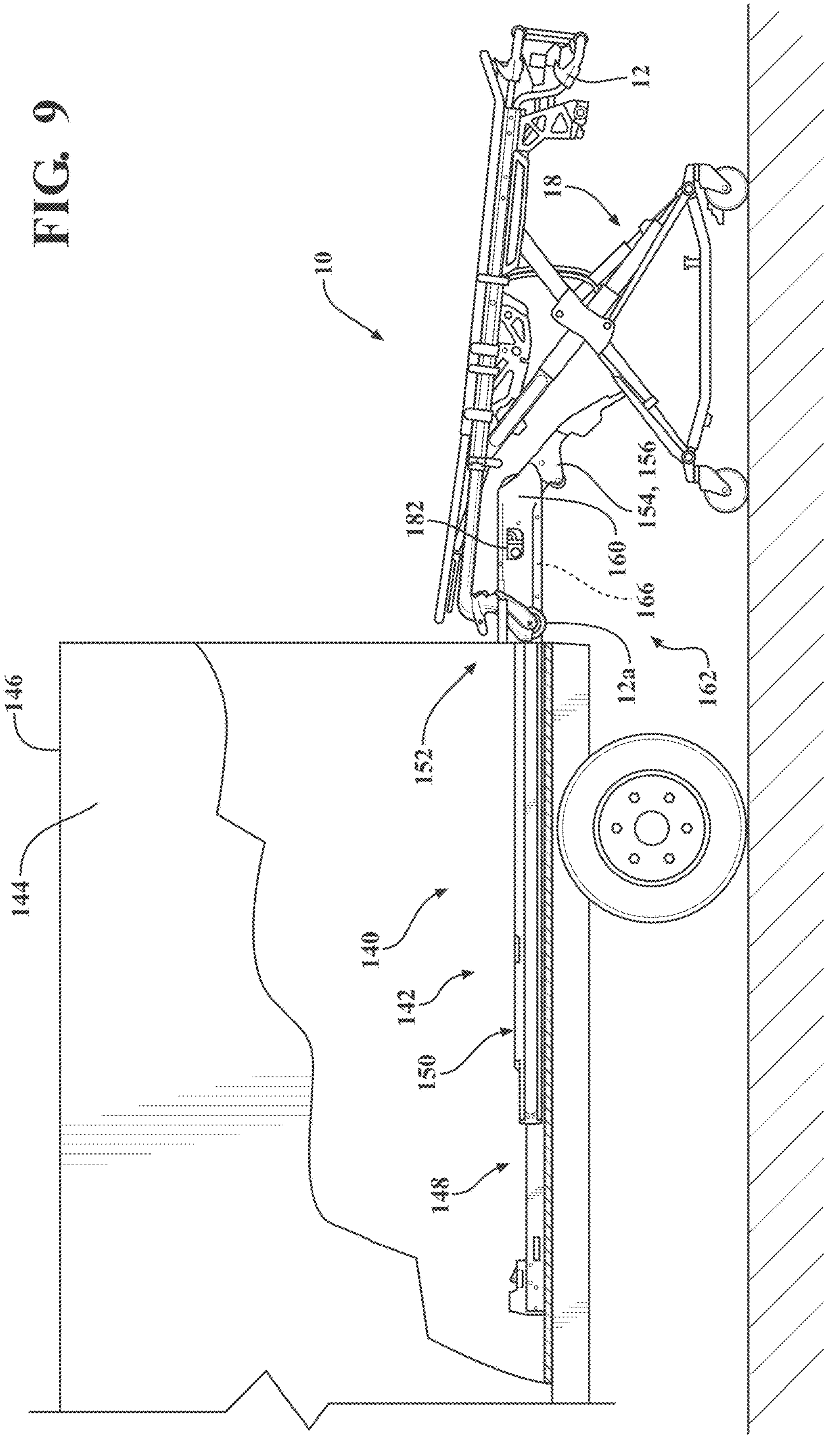
FIG. 9 is a side elevation view of a cargo area of an ambulance with a loading and unloading apparatus of the present invention mounted therein illustrating the loading and unloading apparatus in a deployed configuration according to the teachings of the present disclosure.
Figure 15:
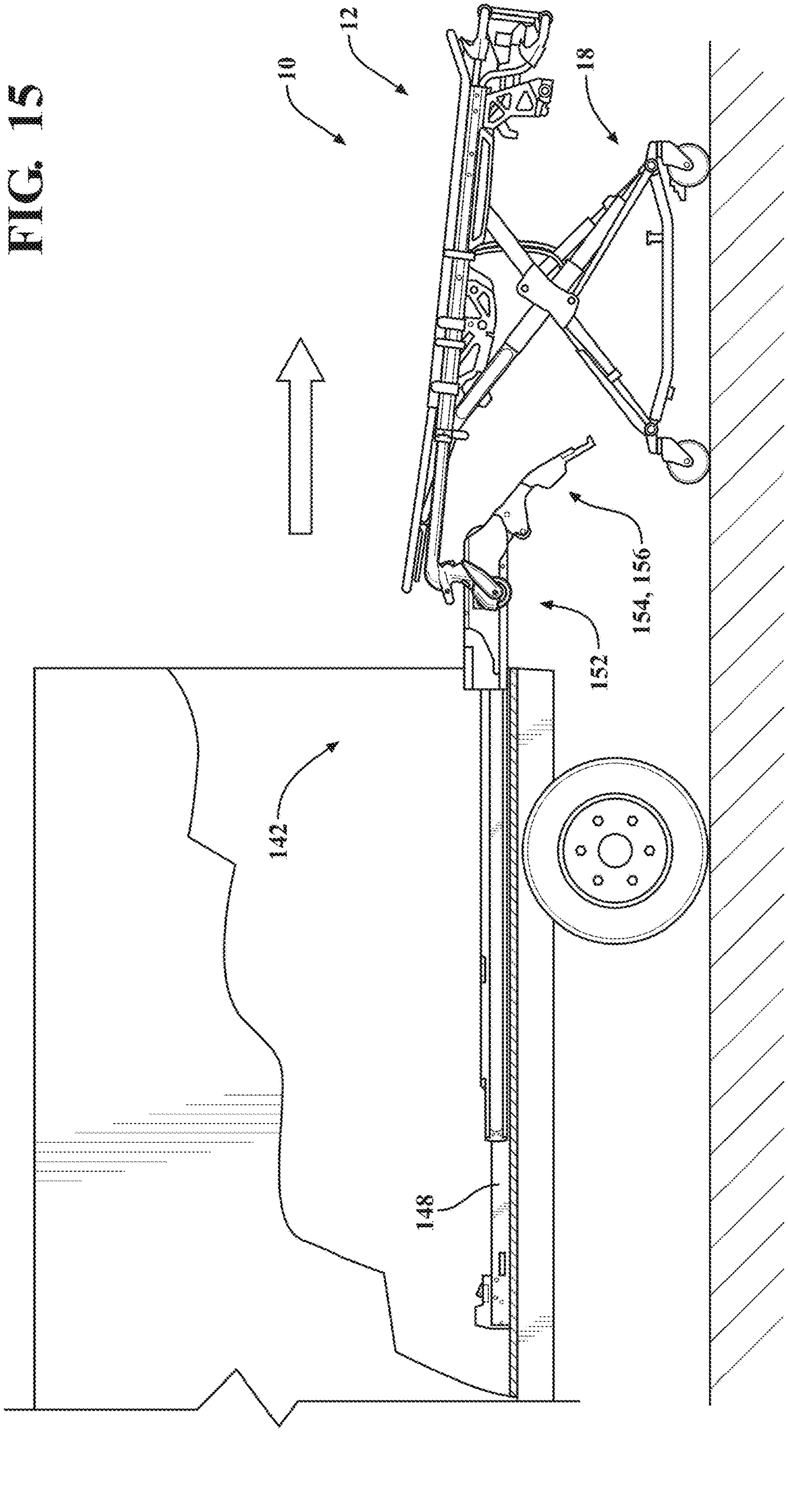
Figure 16:
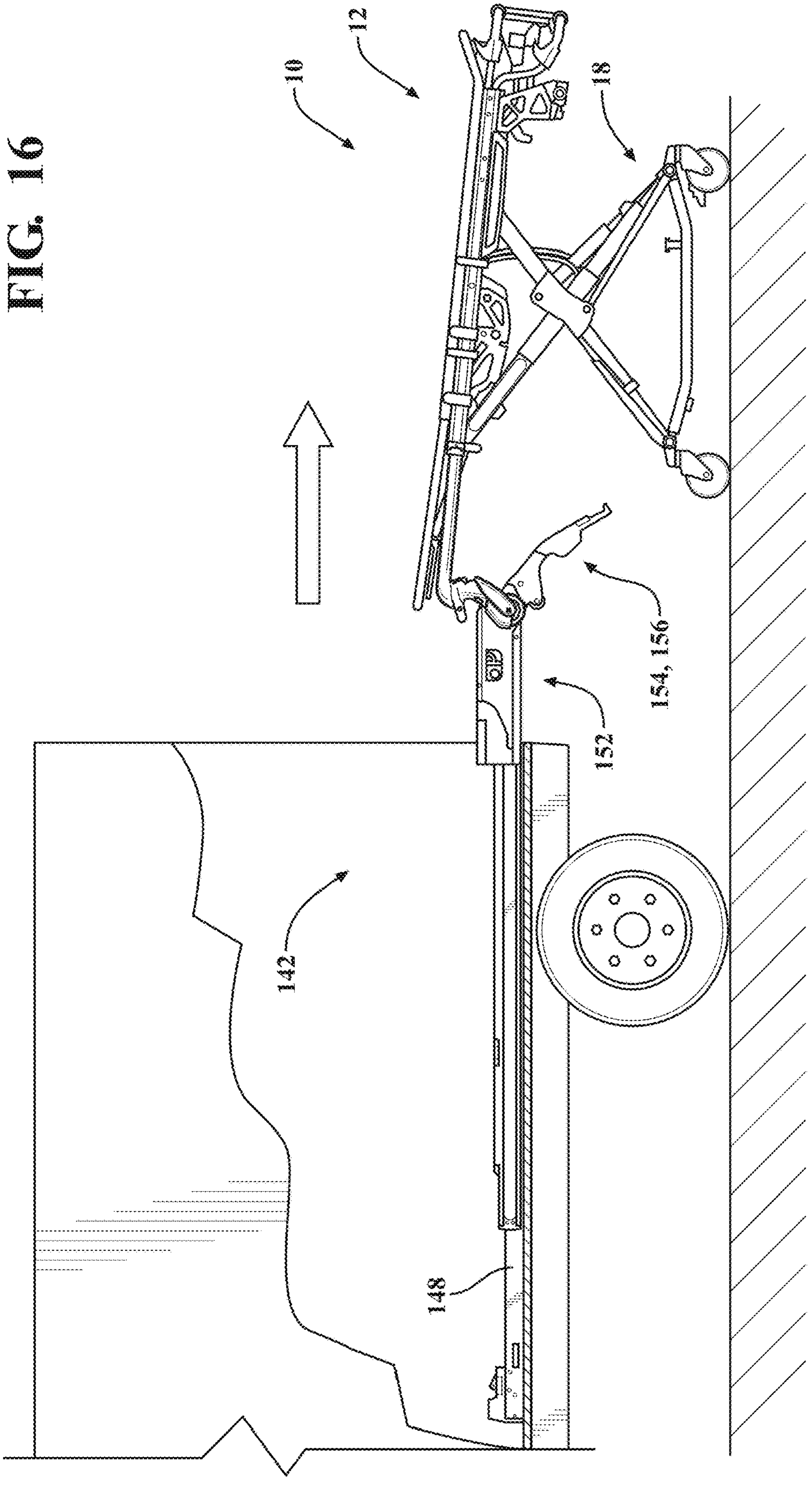

As best seen in FIG. 9, the loading and unloading apparatus 142 includes a support base 148, which is mounted in the cargo area of the ambulance 146 (i.e., the emergency vehicle), and a transfer track 150, which is mounted on the base 18. The loading and unloading apparatus 142 also includes a trolley 152, which is slidably mounted on the transfer track 150 for movement therewith along the base 18. To engage the cot 10, the trolley 152 includes an arm assembly with a pair of cantilevered arms 154, 156 and a trolley frame 158 to which the arm assembly is mounted for pivotal movement by a transverse member 160. When deployed, that is when the arms 154, 156 are in an engaged configuration, the arms 154, 156 may be extended into the head end of the cot 10 in order to support the cot 10 by bearing on a transverse frame member **18*b* of the cot 10. The arms 154, 156 may also be in a released configuration in which the arms 154, 156 do not support the cot 10 such as shown in FIGS. 15 and 16 and as discussed in greater detail below. One or more trolley load sensors 180 may be configured to output a signal that is indicative of whether the arms 154, 156** are in the engaged configuration or the released configuration, as discussed in the proceeding paragraphs.

Figure 19:
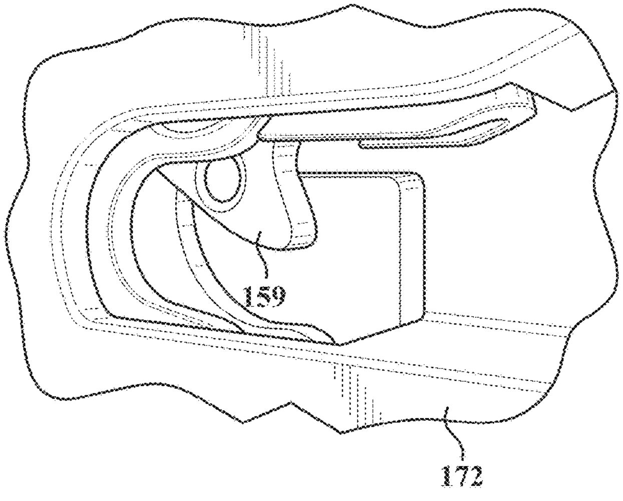
FIG. 19 is an enlarged view of a locking mechanism of the loading and unloading apparatus according to the teachings of the present disclosure.

The transfer track 150 and trolley 152 are configured to provide a nested rail arrangement to provide greater extension of the trolley 152 from the emergency vehicle. In this configuration, the arms 154 and 156 pivot about a pivot axis P that is outside the ambulance, which allows arms 154, 156 to have a greater range of motion. During operation, the arms 154, 156 are pivoted between a lowered, pre-engaged position 162 (FIGS. 9, 15, and 16) and an engaged position 164 (shown in FIGS. 10, 13, and 14) by a drive mechanism 166 (FIGS. 9, 19). The loading and unloading apparatus 142 also includes a control system 168 (shown in FIG. 20) for controlling the actuation of drive mechanism 166. Once the cot 10 is loaded onto the trolley 152 and the arms 154, 156 lift the cot 10, the collapsible base of the cot 10 is collapsed (i.e., the cot 10 is in the fully-retracted configuration) and the trolley 152 along with the cot 10 can be pushed along the base 18 with head end wheels **12*a* straddling the support base 148. Additionally, the nested rail arrangement is provided with at least one latch and more optionally, a series of latches that couple the track to the base and allow the trolley 152 to move along the track and thereafter release the track so it too can move with the trolley 152 relative to the base 18 to thereby fully extend the trolley 152 from the vehicle (FIG. 10**).

Figure 10:
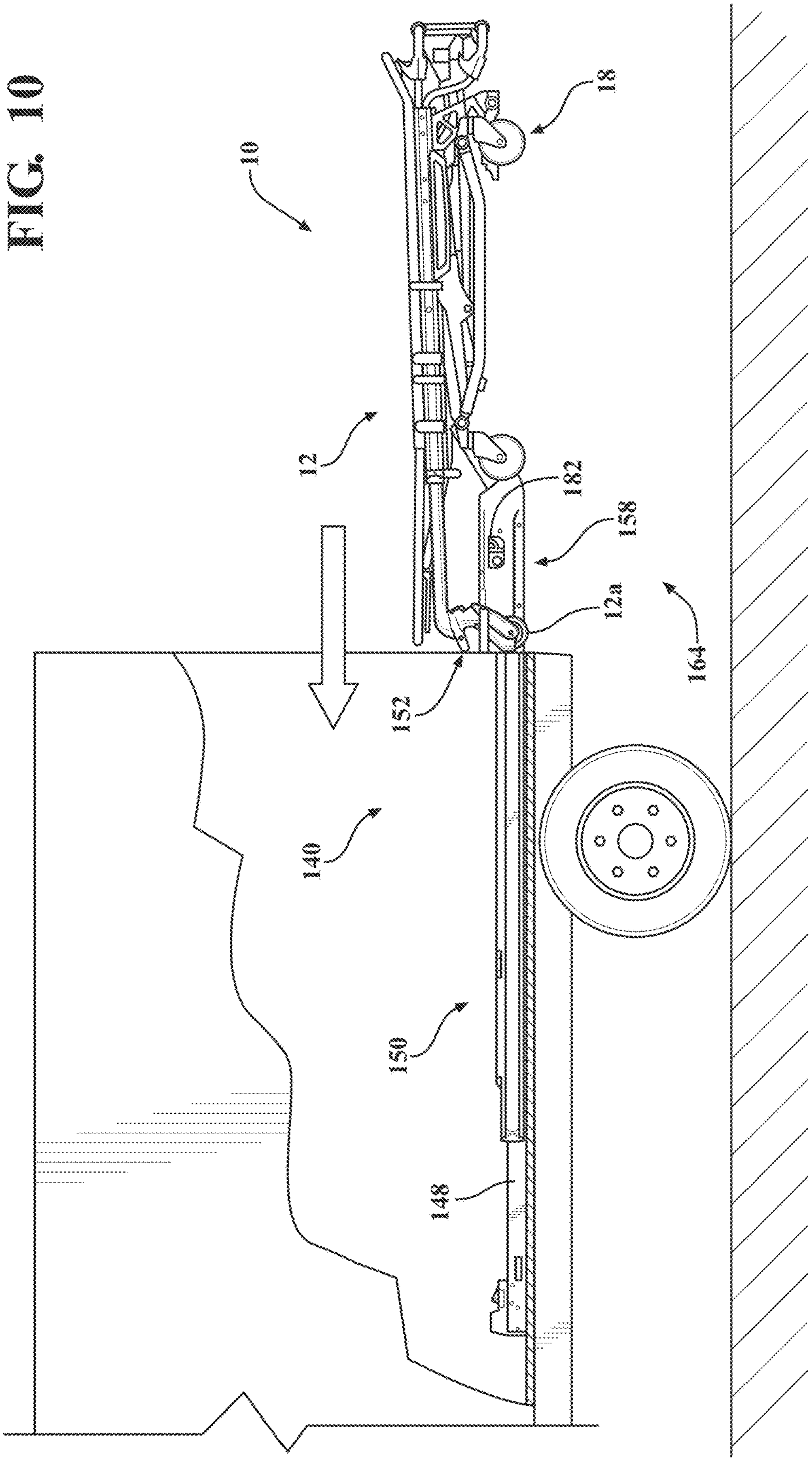
FIGS. 10-12 are a sequence of side views of the ambulance cot being moved into its full stowed position in the cargo area with the loading and unloading apparatus according to the teachings of the present disclosure.
Figure 11:
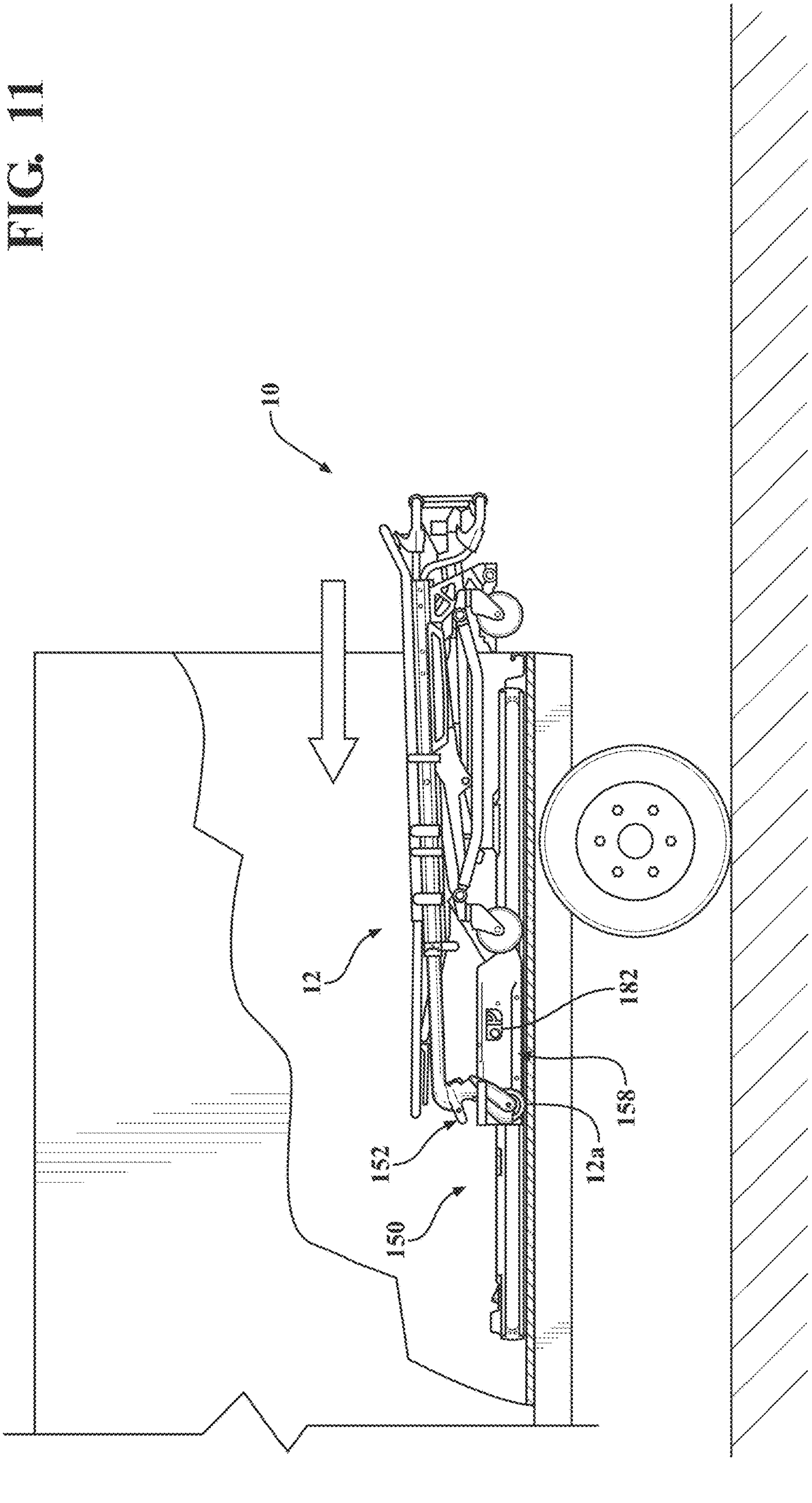
Figure 12:
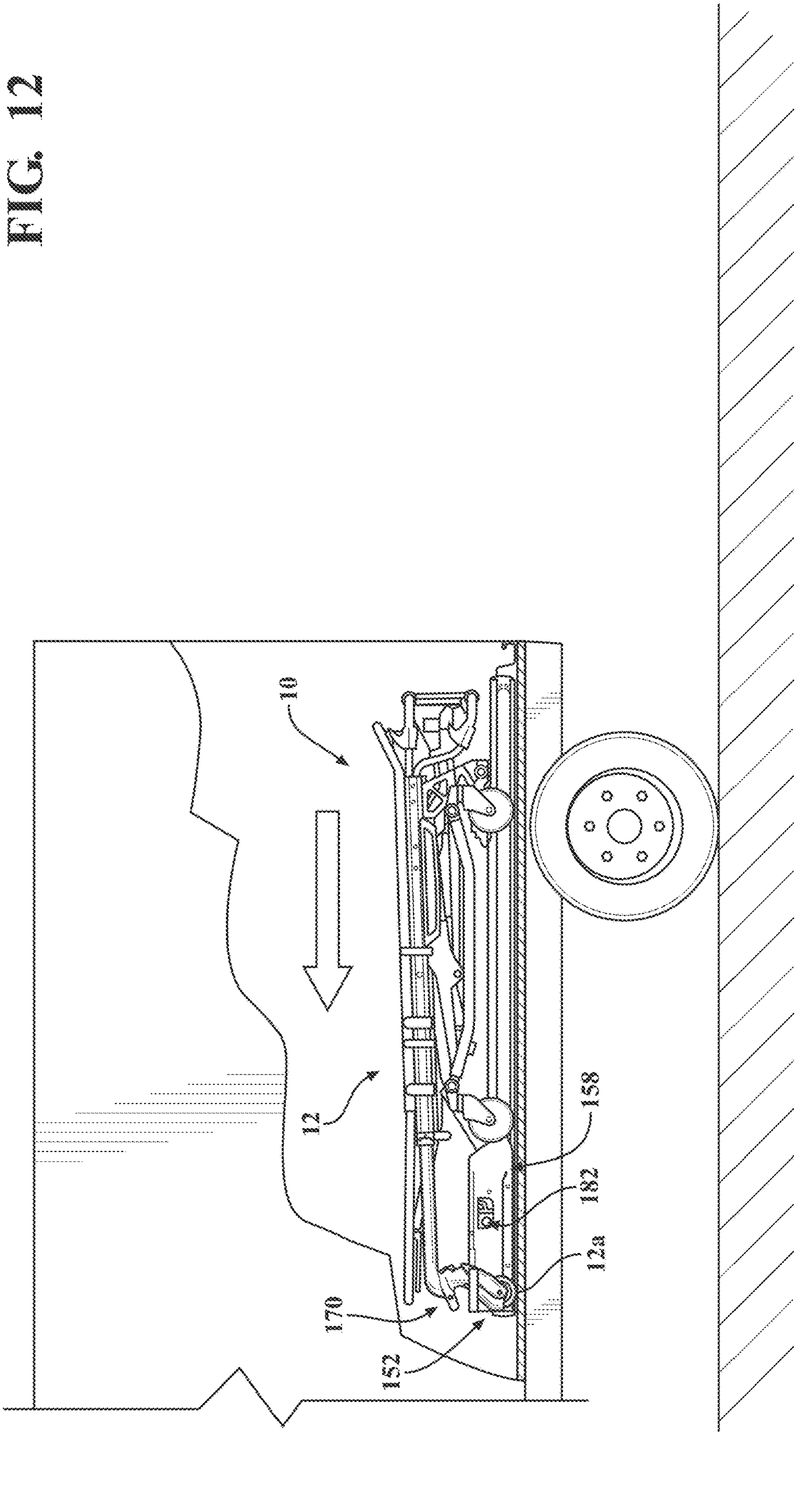
Figure 13:
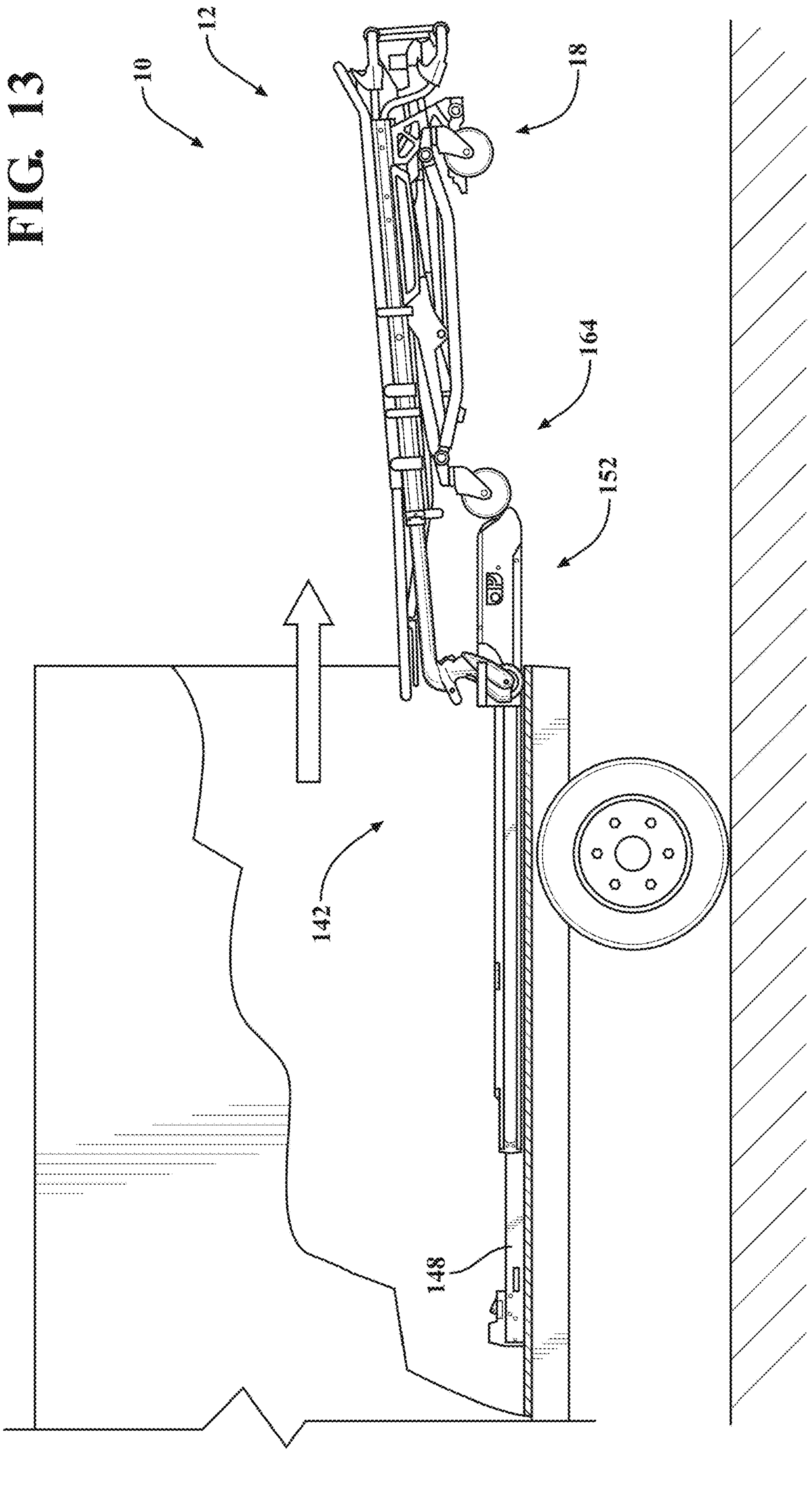
FIGS. 13-16 are a sequence of side views illustrating the ambulance cot being removed from the cargo area according to the teachings of the present disclosure.
Figure 14:
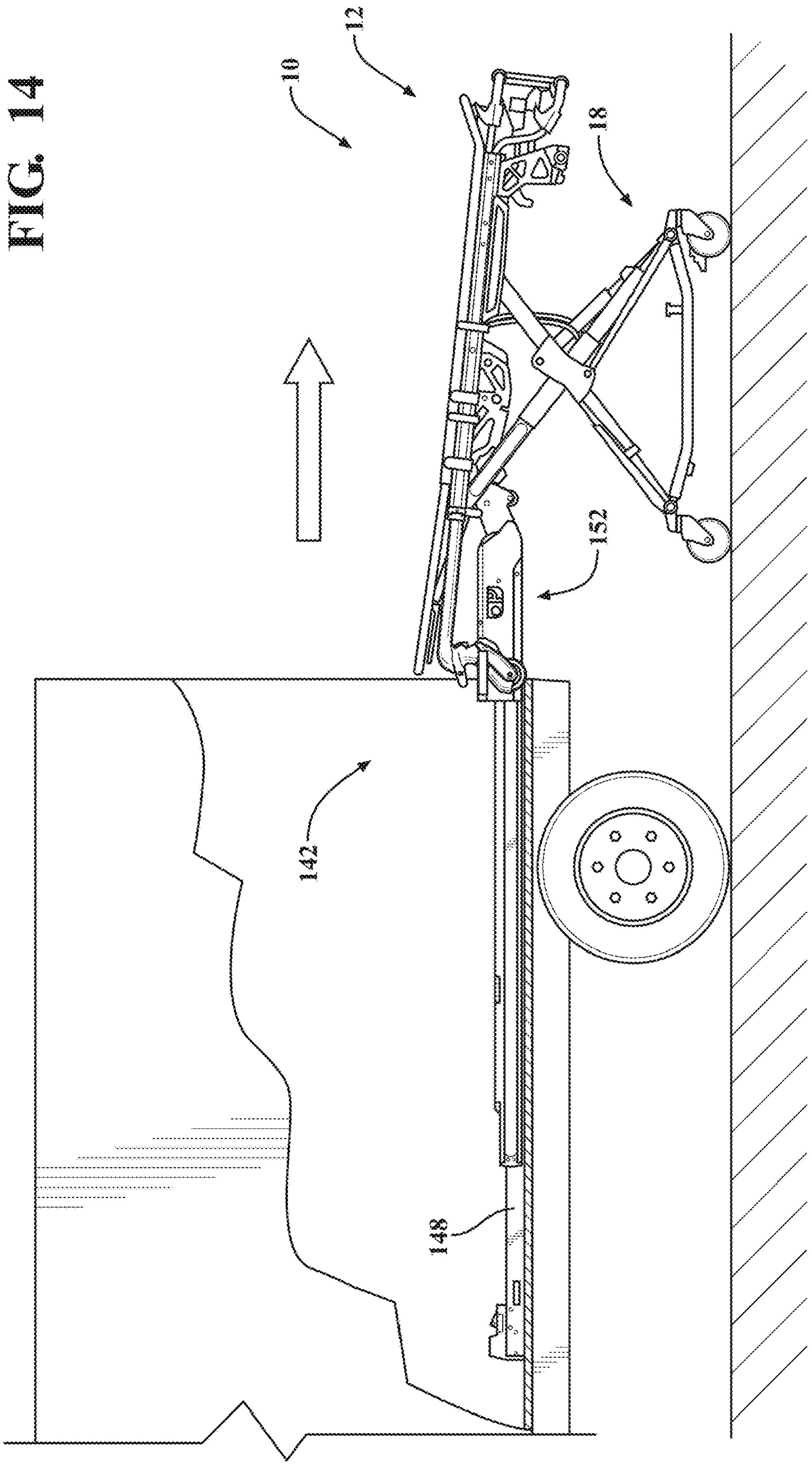
Figure 18:
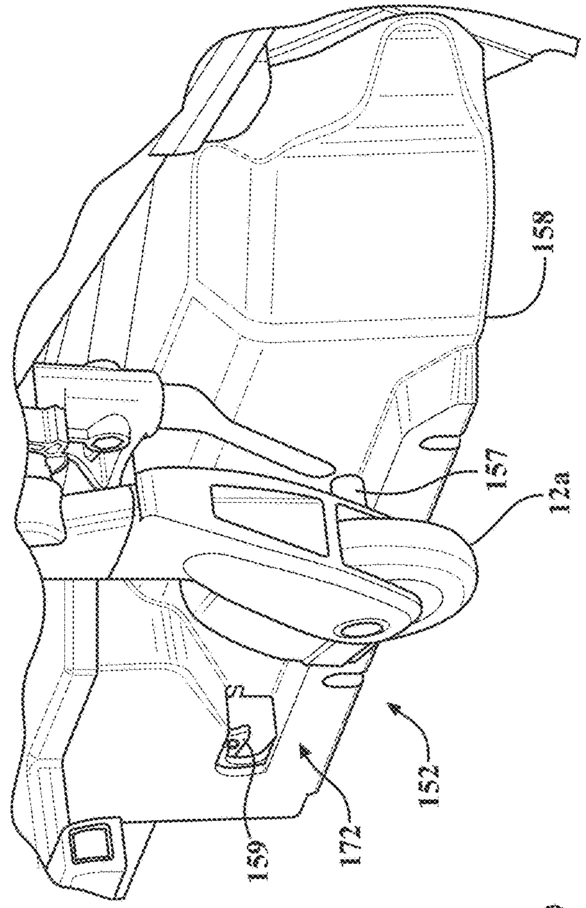
FIG. 18 is an enlarged view of the cot engaged by the loading and unloading apparatus according to the teachings of the present disclosure.
Figure 17:
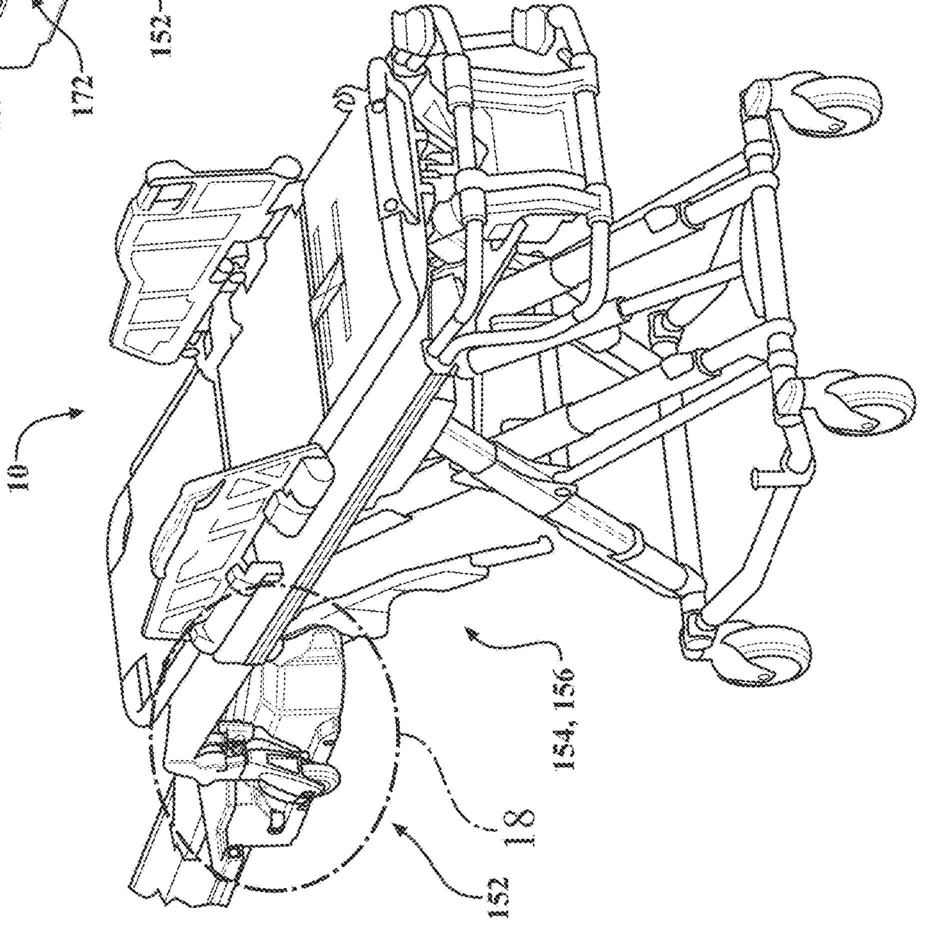
FIG. 17 is a perspective view of the ambulance cot being engaged by the loading and unloading apparatus according to the teachings of the present disclosure.

Referring to FIGS. 10-12, the cot 10 is shown in the fully-retracted configuration. When cot 10 is aligned with the rear opening of the ambulance and trolley 152 is fully extended along the support base 148, and arms 154, 156 are lowered, cot 10 can then be pushed toward the ambulance so that arms 154,156 extend into the cot 10 beneath the head end wheel **12*a* of the frame 12 of cot 10. With reference to FIGS. 17 and 18, the cot 10 is then pushed and guided by guide surfaces formed on the housing of trolley 152 and into a pair of recesses 172 (e.g., a pair of rails) also formed in the housing, which are configured to guide the head end wheels 12*a* into engagement with a locking mechanism 159 (e.g., latches or receivers) on the trolley 152. Each head end wheel 12*a* includes a pin 157 that laterally extends from each wheel and is for releasably engaging the locking mechanism 159. The locking mechanism 159 may be moveable between a locked configuration and an unlocked configuration. When the locking mechanism 159 is in the locked configuration, the pins 157 are prevented from moving out from the locking mechanism 159 and thus help to secure the cot 10 to the trolley 152. Once the pins 157 are secured by the locking mechanism 159 (i.e., the locking mechanism is in the locked configuration), arms 154, 156 may then be raised by the drive mechanism 166 to engage one of the transverse members of the frame 12 and, further, raise the cot 10 off the ground so its collapsible wheeled base may be collapsed and folded. After the wheeled base is folded, the cot 10 may be pushed into the ambulance on the support base 148 using trolley 152 (FIGS. 10-12**).

Referring to FIGS. 13-16, when unloading the cot 10 from the ambulance, the trolley 152 along with the cot 10 are moved along the transfer track 150 to position the cot 10 and trolley 152 outside of the cargo area 144 of the ambulance 146. Once trolley 152 is fully extended, the arms 154 and 156 may be lowered so that the cot 10 can be unloaded from the ambulance 146 to the fully-extended configuration. With the arms 154, 156 in the engaged position 164, the actuator 30 of the cot 10 operates to lower the frame 12 of the cot 10 towards the ground surface. Once the wheels **18*c* of the frame 12 contact the ground surface, the arms 154, 156 are moved to the lowered, pre-engaged position 162 such that the base 18 of the cot 10 fully supports the weight of the cot 10. Aspects of the trolley 152** may be similar to as is described in U.S. Pat. No. 8,439,416, entitled "Ambulance cot and loading and unloading system," the disclosure of which is hereby incorporated by reference in its entirety. Other configurations are contemplated.

Figure 20:
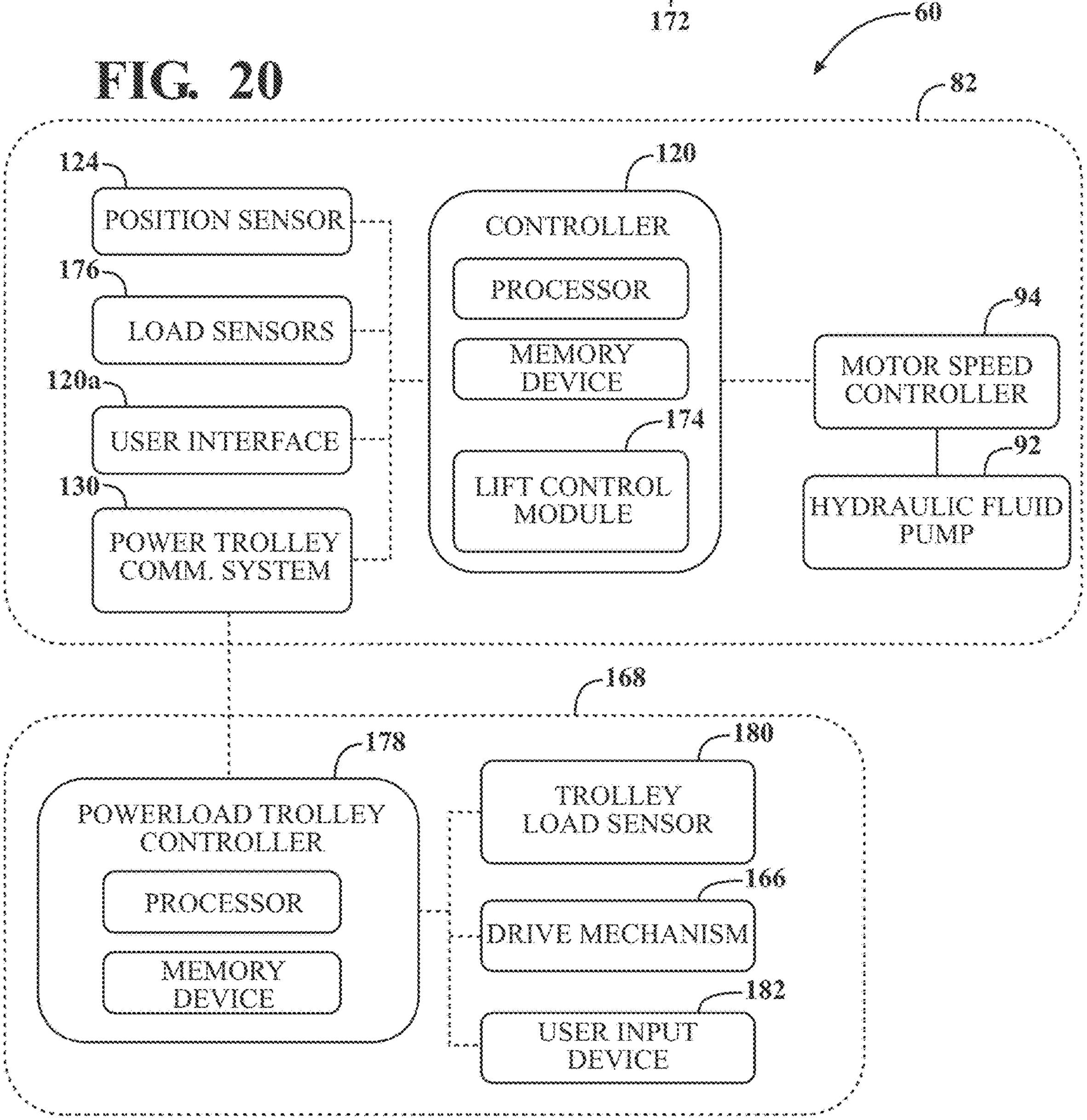
FIG. 20 is a schematic block diagram of the control system used with the hydraulic system according to the teachings of the present disclosure.

Referring to FIG. 20, the controller 120 includes a processor coupled to a memory device. The memory device stores various programs and data that are executed by the processor for operating the control system 82. For example, the memory device stores a lift control module 174 that includes computer executable instructions that, when executed by the processor, cause the processor to operate the control system 82 to extend or retract the hydraulic cylinder 80 as described above.

In addition, the control system 82 includes one or more load sensors 176 for monitoring a load being supported by the base 18 of the cot 10. For example, the one or more load sensors 176 may include a strain gauge that is coupled to a cross member at the base of the hydraulic system 60. The strain gauge is configured to measure the force applied by the hydraulic system 60. The one or more load sensors 176 may also include one or more pressure transducers that are connected to the first and the second hydraulic conduits 96, 100 to provide signals to controller 120 indicative of the magnitude of the fluid pressure within the hydraulic system 60.

The position sensor 124 may also include any other sensor to determine the height of the cot 10, such as for example and without limitation, sensors based on sound or light waves, optical sensors, string potentiometers, hall effect sensors, rotational potentiometers, and/or any suitable sensor that may generate signals that may be used by the controller 120 for determining the height of the cot 10.

The control system 168 for the loading and unloading apparatus 142 includes a trolley controller 178 (with a processor/microprocessor and memory storage device)

which is in communication with one or more trolley load sensors 180, the drive mechanism 166, and a user input device 182 which is provided at the trolley 152. The user input device 182 (loading and unloading apparatus-based or trolley-based user input device) includes user actuatable buttons or switches to allow a user to input signals to operate the drive mechanism 166 for raising or lowering arms 154, 156. The trolley controller 178 is in communication the one or more trolley load sensors 180, such as a load cell, including an analog strain gauge, for detecting whether load is applied to the respective arms 154, 156.

The control system 82 and the control system 168 each include a communication board with wireless transmitters and/or receivers, such as RF devices, inductive devices, acoustic device, optical devices, or infrared devices, between the control system 82 of the cot 10 and control system 168 of the loading and unloading apparatus, more particularly, the trolley controller 178 so that the control system 82 of the cot 10 can control the devices at the loading and unloading apparatus 142. Communication may be one-way or two-way communication. Further, the control system 168 may be configured as a slave to the control system 82 of the cot 10, which may be configured to act as the primary control system when the cot 10 is loaded onto or adjacent loading and unloading apparatus 142 to allow an attendant to control the loading and unloading apparatus 142 from the foot end of the cot 10, while still providing redundant controls, for example, at user input device 182. Alternately, the control system 82 of the cot 10 may be configured as a slave to the control system 168 of the loading and unloading apparatus 142.

With reference to FIGS. 13-16, as the cot 10 is removed from the ambulance and begins extending the base 18 towards the ground while the arms 154, 156 on the trolley 152 start to lower to decouple the cot 10 from the trolley 152 as the cot 10 becomes supported on the ground, the timing between the extension of the base 18 and the movement of the arms 154, 156 can cause issues with certain terrain and under certain conditions (loaded with a heavy patient). Depending on whether the cot 10 has weight on it or not, and how high the cot 10 is from the ground in general (and note that it sags significantly under weight), there can be various use cases that result in jerky/undesired movement when unloading the cot 10 from the trolley 152.

When unloading from the trolley 152 (i.e., when the full weight is transferred from the trolley 152 to the cot 10), the cot 10 may be analogized to a giant spring. Under ideal circumstances, the cot 10 is at a good unload height and may easily be unloaded from the trolley 152 without the patient or any emergency personnel experiencing any discomfort. However, in less than ideal circumstances, the cot 10 may be too low or too high. When the cot 10 is too high, the pins 157 may be wedged into the trolley 152 causing the cot 10 to act like a spring held in compression when unloaded from the trolley 152 and thus the cot 10 may pop up out of the trolley 152 causing discomfort to the patient and/or transporters. When the cot 10 is too low, the pins 157 may drag on the rail, and the cot 10 may act like a spring held at tension and thus the cot 10 may slide down the arms 154, 156 until it reaches equilibrium. In another less than ideal circumstance, the wheels 18*c* may touch the ground before the arms 154, 156 are in the unload position, this may cause the cot 10 to spring upwards after being released from the trolley 152. In these less than ideal circumstances, the patient may experience discomfort as the movements of the cot 10 can appear sudden and jerky.

To solve the above-mentioned problems, one or more control systems, such as the control system 82 and the control system 168, are presented that implement a method for ensuring that the cot 10 is at the proper height when unloading from the trolley 152. The control system 168, in particular, the controller 120 determines a target lift configuration while the cot 10 is being unloaded from the ambulance as the actuator 30 moves toward the fully-extended configuration. The target configuration may be determined by a transfer function that takes into consideration one or more values obtained from the one or more load sensors 176 (i.e., the pressure transducer) and the position sensor 124 at a first time (t0) and/or at a second time (t1), as discussed in greater detail below. When the locking mechanism 159 moves from the locked configuration to the unlocked configuration to release the pins 157, the controller 120 may drive the actuator 30 based on the target lift configuration to limit relative movement between the cot 10 and the trolley 152. This solves the previously mentioned problems caused by the cot 10 being loaded to the trolley 152 improperly, such as when the cot 10 is too high or too low when loaded into the trolley 152.

While a particular solution to solve the aforementioned problems is discuss in detail throughout the disclosure, it is understood that other methods or solutions (ideal, indirect and mechanical) may be employed. For example, an ideal solution is to provide additional instrumentation for the system to detect the force of the trolley 152. The force applied to the cot by the trolley 152 is minimized or reduced to zero, the cot 10 will be easily unloaded from the trolley 152. This can be directly measured by doing either one of the following (i) one or more pressure switches inside the locking mechanism 159 or on the pins 157, (ii) one or more pressure transducers or one or more strain gauges on any component that the locking mechanism 159 or the pins 157 are affixed to, (iii) a video or a camera to determine if the pins 157 are touching the top or the bottom of the locking mechanism 159, (iv) a capacitive or resistive (or similar touch sensitive) material in the locking mechanism 159 or the pins 157 to determine any form of contact between the locking mechanism 159 and the pins 157, (v) a force sensor on the trolley 152 configured to determine if the trolley 152 is supporting any weight or is being lifted from the mounting bracket, and (vi) any combination of (i)—(v) of this paragraph.

An indirect solution may take advantage of the dynamic characteristics of the system. For example, indirect solutions may include (i) measuring the change in position of either the cot 10 or the trolley 152 when unloading the cot 10 (e.g., how far the spring compresses), (ii) determining the rate in which the force of the extending legs changes (e.g., how much energy is being put into or removed from the spring), (ii) measure distance to the ground captured by any range finding technology, (iii) measure an angle of the power load system relative to the ground to determine correct height relative to uneven ground, (iv) speed coordination between the trolley 152 and the cot 10 to provide consistent unload heights throughout the process, and (v) any combination of (i)—(iv) of this paragraph.

Mechanical solutions may also be employed. Such mechanical solutions include: (i) a pillow valve (e.g., pressure relief valves 90*a* and 90*b*) may be employed within the hydraulic system 60 to relieve pressure to always error on the side of dragging on the recesses 172 of the trolley 152. Other mechanical solutions may include (i) always increasing the pressure to error on the "wedged" side and then opening up a valve to attempt to equalize pressure, (ii)

velocity fuses in the system to prevent overcorrection from a pillow valve, (iii) employing a spring loaded (or similar) locking mechanism 159 to prevent fast popping up from a wedged scenario, (iv) spring loaded (or similar) trolley 152 to set the cot 10 on the ground slowly for the dragging on the recesses 172 scenario, and (v) any combination of the (i)—(iv).

The one or more load sensors 176 are used to define a first time (t0), where the wheels 18*c* of the cot 10 have contacted a ground surface. At this point in time, the control system 82 records the pressure p(t0) in the hydraulic cylinder 80 of the hydraulic system 60, and also determines the height h(t0) of the cot 10 based on the position sensor 124.

The trolley load sensor 180 (i.e., the arm sensor) on the trolley 152 is used to define a second time (t1), where the arms 154, 156 have completely released the weight of the cot 10, but the cot 10 is still at least partially supported by the trolley 152 as the wheels 18*c* of the cot 10 are still locked to the transfer track 150 (creating a pivot point) via the pins 157 being seated within the locking mechanism 159. At the second time (t1), the control system 82 records the pressure p(t1) in the hydraulic cylinder 80 of the hydraulic system 60, and also determines the height h(t1) of the cot 10 based on the position sensor 124. Depending on the determined load and height of the cot 10 relative to each other at that point in time, the control system 82 will alter how the rest of the extend sequence works to ensure that the correct height for that particular situation is achieved (e.g. to allow the cot 10 to be fully decoupled from the powerload track without dropping down or popping up).

Figure 21:
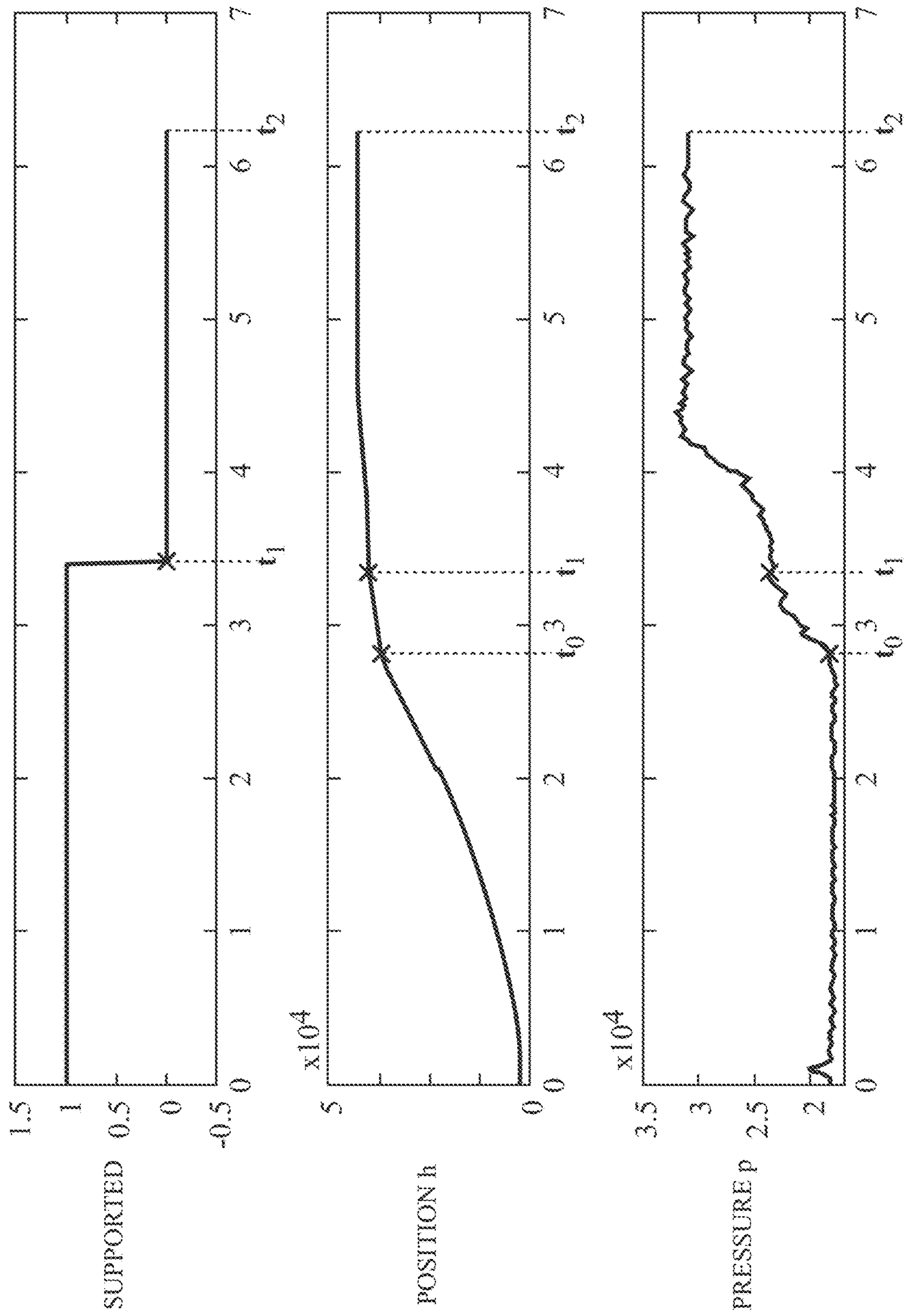
FIGS. 21-24F are graphs illustrating various sensed operational parameters during an unloading operation of the loading and unloading apparatus and the ambulance cot according to the teachings of the present disclosure.
Figure 22:
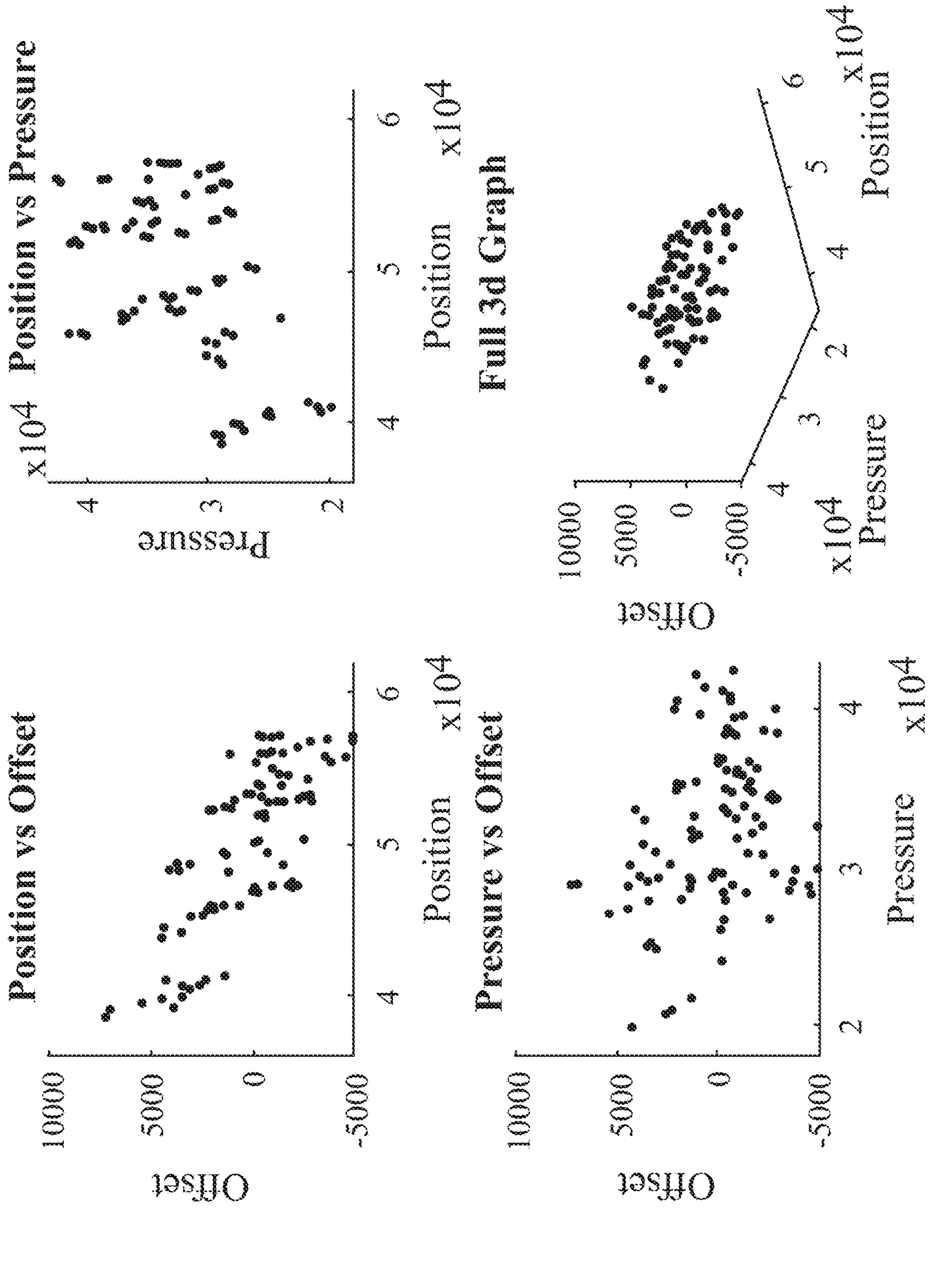

The graphs shown in FIGS. 20-22 illustrate an unloading operation of the trolley 152 and the cot 10, where p(t) =pressure from the one or more load sensors 176 (i.e., the pressure transducer) at given time; h(t)=height from the position sensor at given time; t0=the moment in time when the cot legs (e.g. wheels 18*c*) touch the ground; t1=moment in time when the trolley 152 indicates that the arms 154, 156 no longer support the cot 10; and t2=the final result of the unloading process. The one or more trolley load sensors 180 on the trolley 152 inform the control system 82 of the cot 10 if the arms 154, 156 are in the engaged configuration or the released configuration (i.e., whether or not the arms 154, 156 are supporting the cot 10). This signal from the one or more trolley load sensors 180 is transmitted to the control system 82 of the cot 10 as either a "1" (the arms 154, 156 are supporting the cot 10) or a "0" (arms 154, 156 are no longer supporting the cot). The controller 120 uses this signal as a trigger to determine the target lift configuration. and begin driving the actuator 30 at the target lift configuration. During the unloading process, when t=t0, the moment in time when the cot wheels 18*c* touch the ground, the control system 82 detects an increase in pressure. At t=t1, the control system 82 detects that the trolley 152 indicates that it no longer supports the cot 10. At t=t2, the end of each graph is the end result of the unloading operation, which is a value the control system 82 calculates, corresponding to the target lift configuration, to smoothly unload the cot 10 from the trolley 152.

As show in FIG. 21, the pressure and position from t1 to t2 both increased, which in this example, indicates that the cot 10 had to perform a small lift operation to come out of the trolley 152 smoothly in order to avoid jerky movement. Sometimes a lower operation is required, and at other times no correction is needed depending on whether the cot 10 was loaded into the trolley 152 at the appropriate height.

The control system 82 is programmed based on transfer functions that were theorized, tested, and optimized for the cot 10, as described in greater detail below. Here, the initial theory was that a transfer function f(h) could be used to describe the nominal adjustment to achieve the desired end position of the cot 10 given the change in position of the cot 10 from t1 to t2; and that a transfer function g(p) could be used to describe the nominal adjustment to achieve the desired end position of the cot 10 given the change in pressure from t1 to t2. Using these transfer functions f(h), g(p) to calculate the adjustment and add the calculated adjustment (based on the change in position and pressure) to the position where the cot 10 supports itself (e.g., at t1), the control system 82 can closely estimate the desired end position of the cot 10 to exit the trolley 152 smoothly using the following equation:

$$h(t1)+f(h(t1)-h(t0))+g(p(t1)-p(t0))\approx h(t2), \text{ where } f(h) \text{ and } g(p) \text{ are the transfer functions.} \quad \text{Equation (1):}$$

Given that the data at t0 can be estimated from the height of the cot 10, the control system 82 can adjust ƒ(h) and g(p) to include the initial conditions. In addition, ƒ(h) includes the input argument of h(t1), so this data point can be folded into the transfer function ƒ(h), which simplifies the calculation as follows:

$$f'(h(t1))+g'(p(t1))\approx h(t2), \text{ where } f'(h) \text{ and } g'(p) \text{ are the adjusted transfer functions.} \quad \text{Equation (2):}$$

Figure 23:
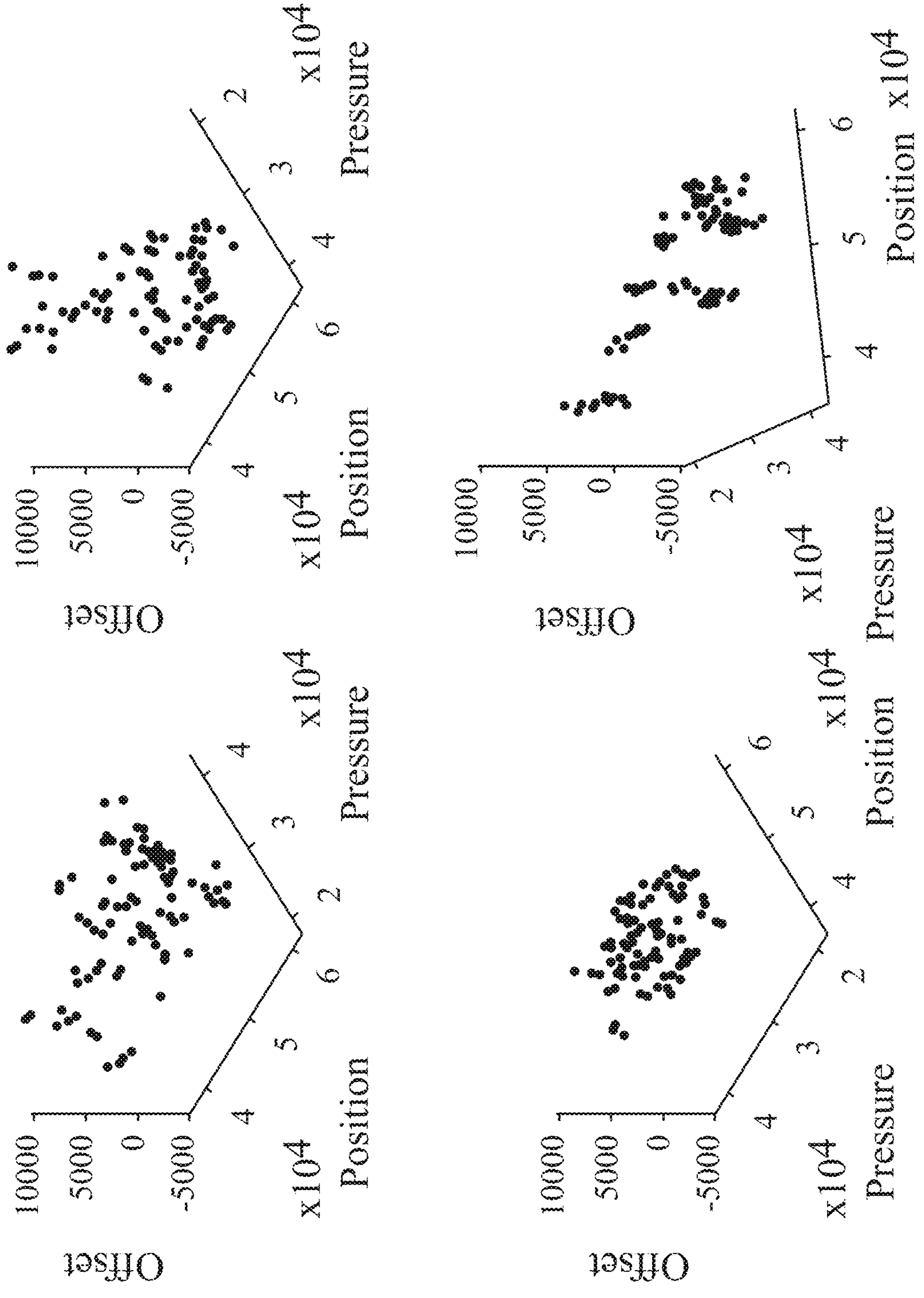
Figure 24A:
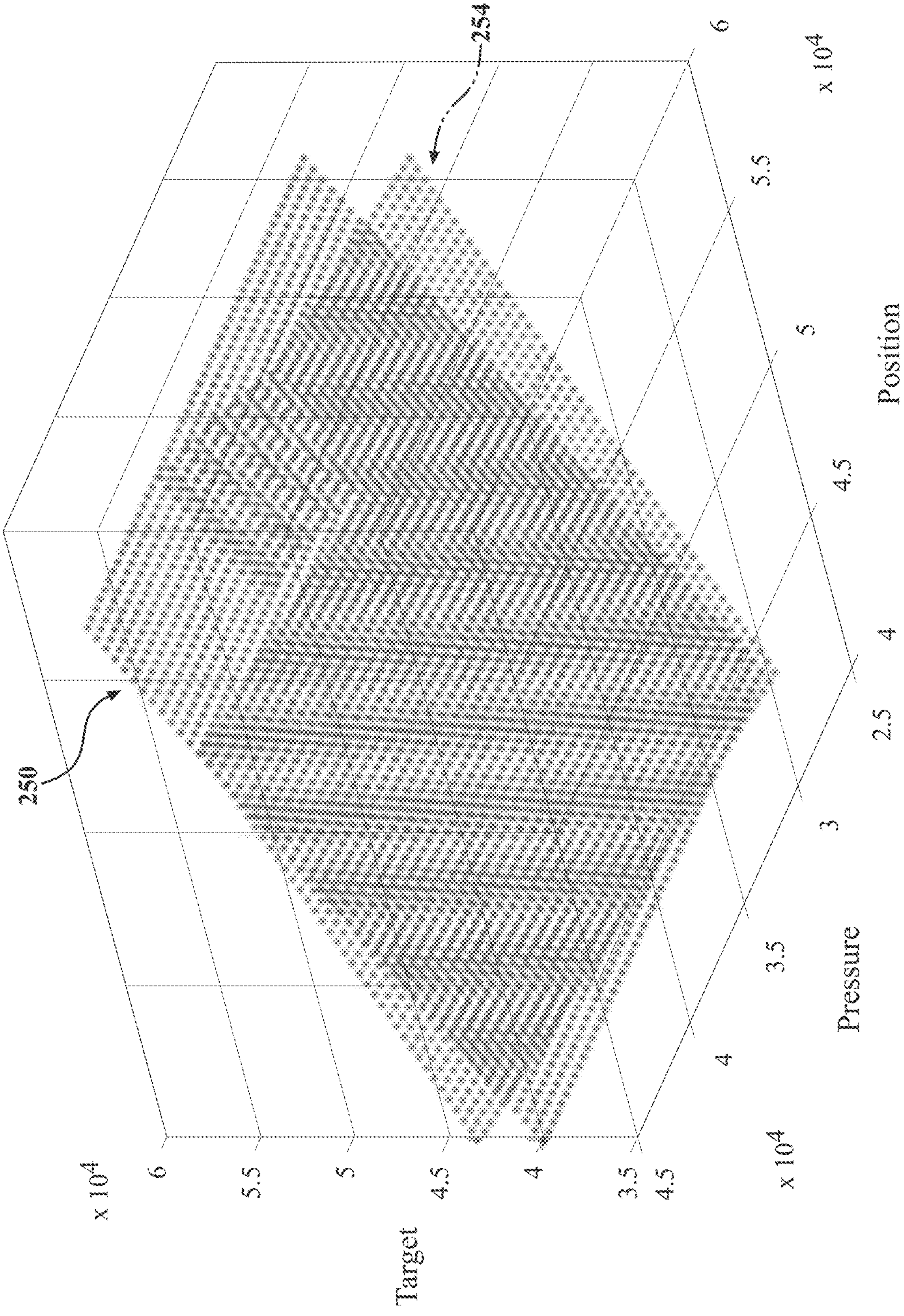
Figure 24B:
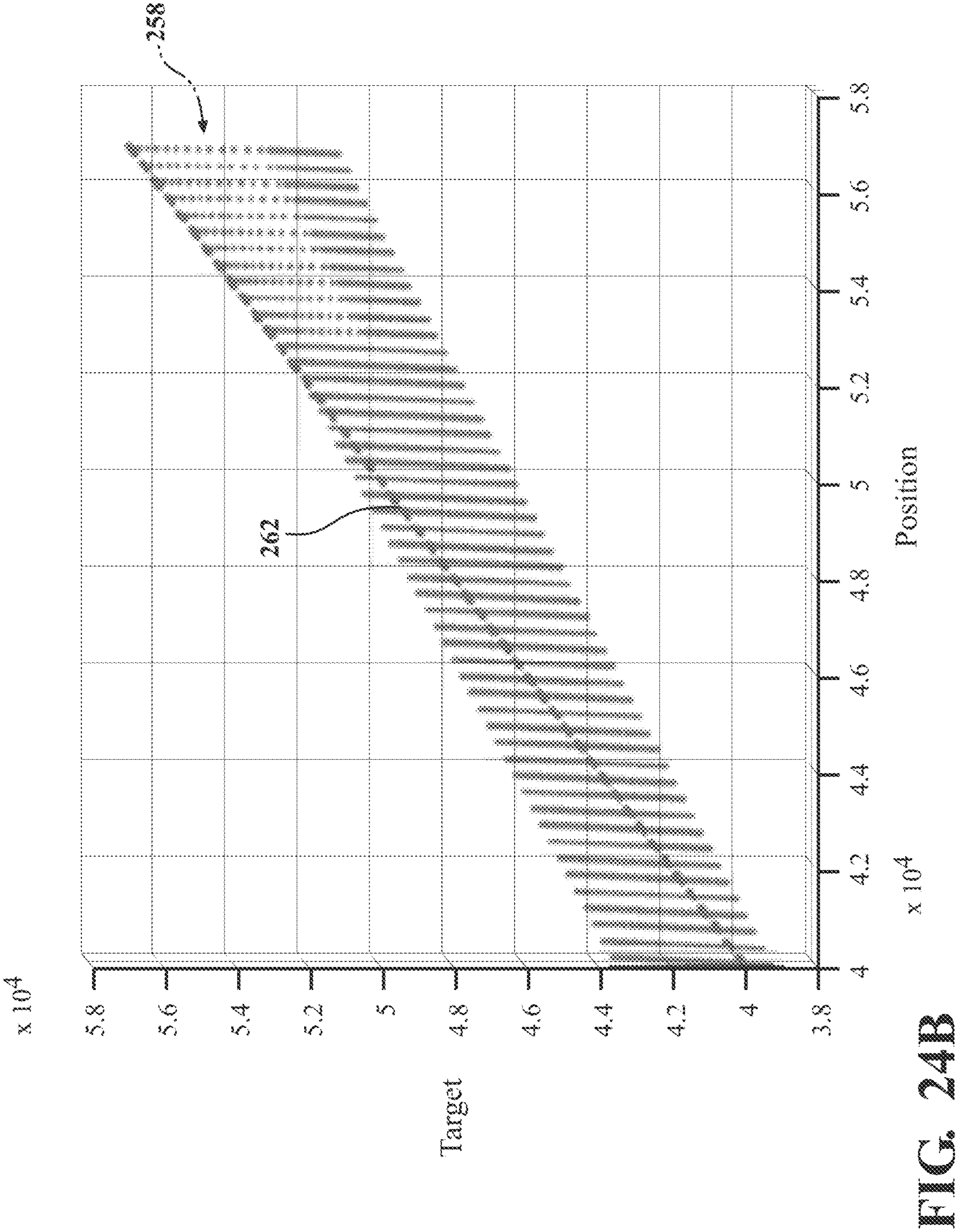
Figure 24C:
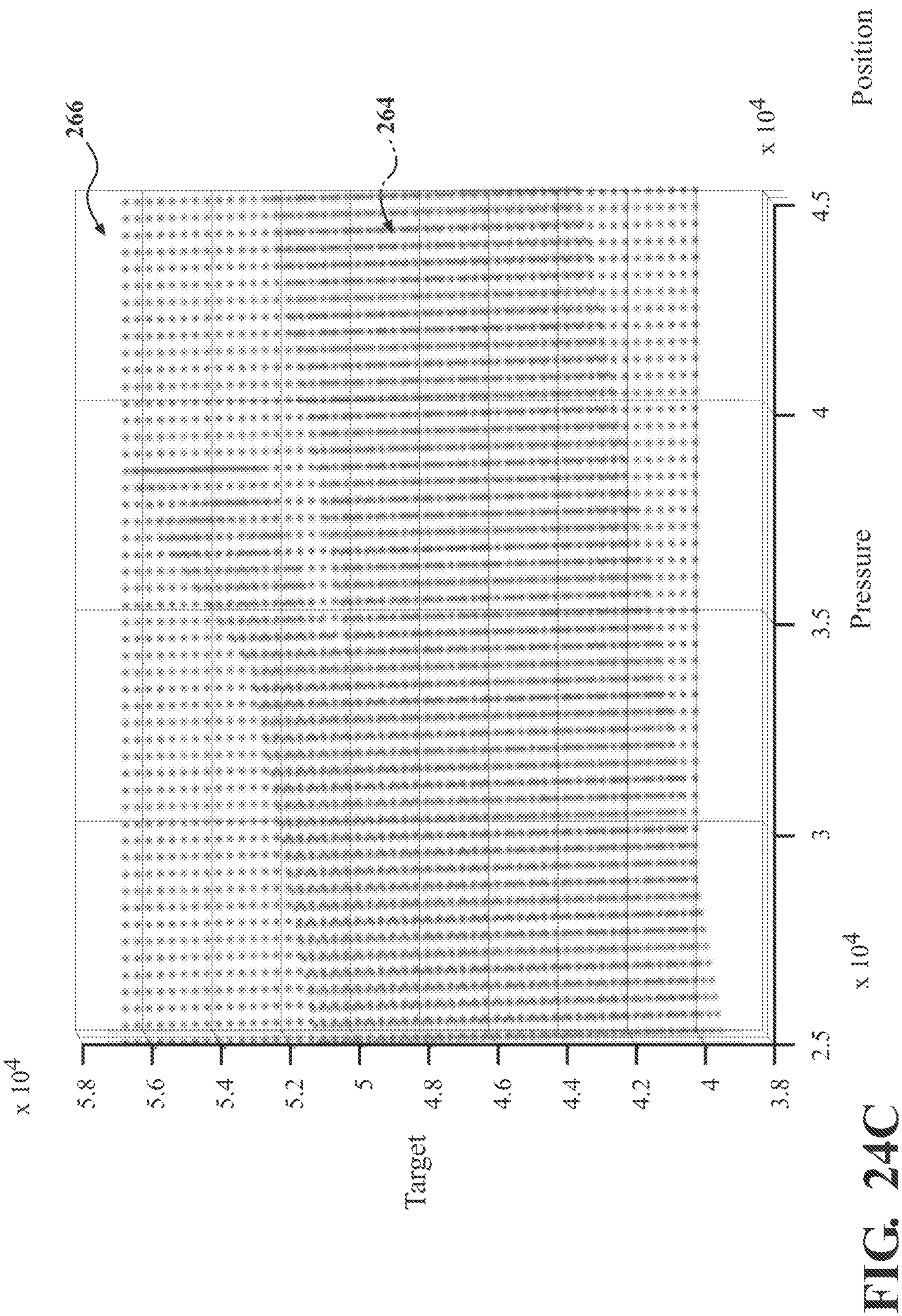
Figure 24D:
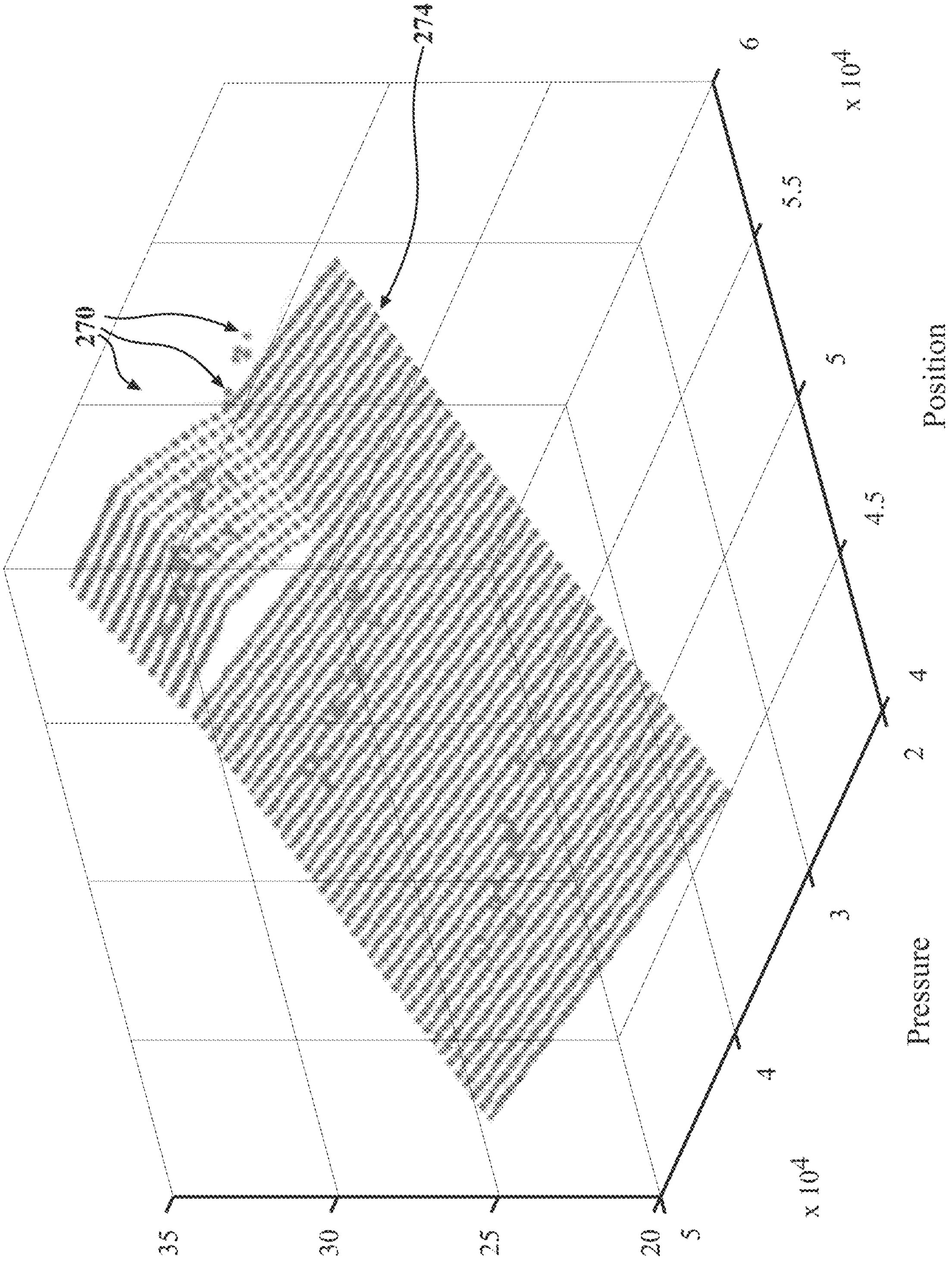

As shown in FIGS. 22-23, the first collection of graphs (shown in FIG. 22) shows the relationships between each of the values (position v. offset, position v. pressure, pressure v. offset, and pressure v. position v. offset). The second collection of graphs (shown in FIG. 23) show different views of the same data set (data presented in different ways corresponding to adjusted axes). The graph on the bottom right hand corner of FIG. 23 demonstrates that there is a connection between the variables (e.g., linear relationships).

With reference to FIGS. 24(*a*)-24(*f*), various graphs are shown that were used for determining the transfer functions. The graph shown in FIG. 24(*a*) includes a first set of dots 250 that indicate initial conditions of calculation. In the first set of dots 250, the target is equal to the position. A second set of dots 254 indicates the calculated target position and/or pressure. The corners of the first and second sets 250, 254 show the extremes of the calculation. For example, high pressure/low height on the left, low pressure/high height on the right, high pressure/high height on the top, and low pressure/low height on the bottom.

With reference to FIG. 24(*b*), the effects of height on the target calculation are shown. The region 258 indicates all target positions from the initial position indicated by the dashed line 262. With reference to FIG. 24(*c*), the graph shows the effect of pressure. As shown in the graph, in a middle region 264, a first set of dots and a second set of dots are overlapping. In the top right corner, the second set of dots cannot be seen. This is because this is a no adjustment region 266. In the no adjustment region 266, high pressure and high height at any adjustment would be bad so no adjustments are made.

With reference to FIGS. 24(*d*)-24(*f*), the graphs show the live ideal data 270 against the calculated data 274. The live ideal data 270 was obtained by setting the cot 10 height manually to easily load/unload from the trolley 152. Note that there is a built in "error" in this algorithm that causes the cot 10 to over correct in the lower direction for low pressure. This is because the under case is easier to unload than the over case with an unloaded cot 10.

Using, for example, the data depicted in FIGS. 22-23, a relationship was formed and by conducting tests on the cot 10, it was determined that the position sensor 124 should be normalized with relative minimum and maximum heights of the cot 10. Here, the implementation uses position as a percentage, denoted as h*. To simplify the transfer functions even further, two a*x+b equations may be used as approximations of the transfer functions. Differential equations may also be used in place of the simplified line equations a*x+b. To simplify once more, the b terms of both transfer functions may be combined in g'(p), resulting in a final implementation as:

$$f'(h=h^*(t1))=0.29^*h; \text{ and} \qquad \text{Equation (3):}$$

$$g'(p=p(t1))=-0.21^*p-0.09 \qquad \text{Equation (4):}$$

This is with the caveat that if the height of the cot 10 is above a certain percentage (97% in this case) and the pressure is around that of a 500 lb lift, no adjustment is required (as these are the hard physical limits of the system). The transfer function at and above those data points suggest that a lower operation is required. When the input values are above those limits, the transfer functions are ignored, and no adjustment is made.

Figure 25:
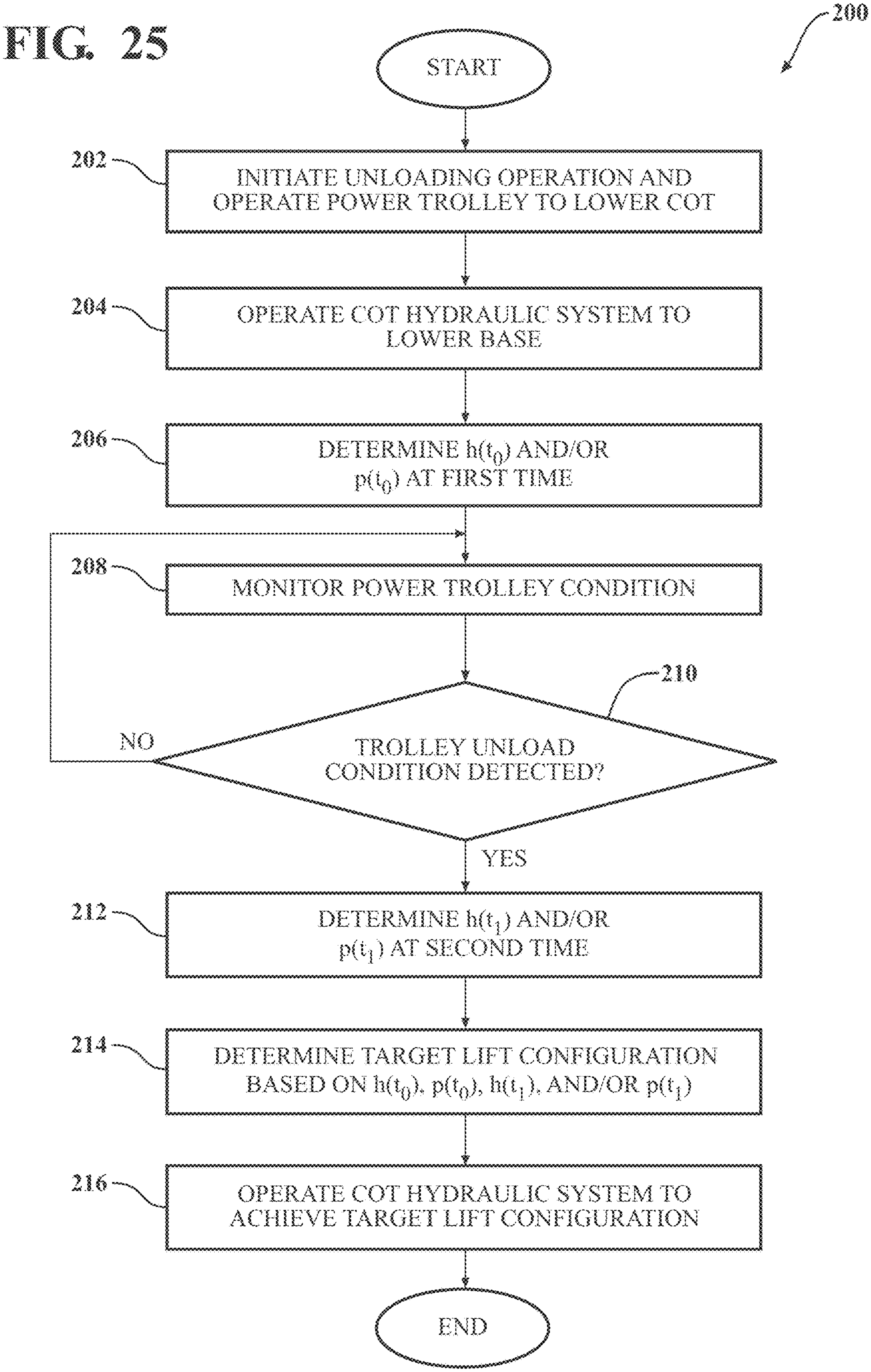
FIG. 25 is a flowchart illustrating an algorithm executed by the control system for operating the hydraulic system of the patient support apparatus during the unloading operation for powered unloading dynamic weight adjustments according to the teachings of the present disclosure.

For example, FIG. 25 includes a flow chart of method 200 illustrating an algorithm included with the lift control module 174 and performed by the processor of controller 120 when executing the lift control module 174 for operating the hydraulic system 60 to perform powered unloading dynamic weight adjustment. Each method step may be performed independently of, or in combination with, other method steps. Portions of the methods may be performed by any one of, or any combination of, the components of the control system 82 and/or the control system 168. As will be appreciated from the subsequent description below, this method 200 merely represents an exemplary and non-limiting sequence of blocks to describe operation of the control system 82 and/or the control system 168 and is in no way intended to serve as a complete functional block diagram of the control system 82 and/or the control system 168.

The method 200 begins at step 202, the controller 120 initiates an unloading operation and operates the trolley 152 to actuate arms 154, 156 to lower the cot 10 towards the ground surface and unload the cot 10 from the trolley 152. For example, in some embodiments, the controller 120 may receive a signal from an operator via the user interface 120*a* to initiate an unloading operation and transmits a signal to the control system 168 to cause the control system 168 to operate the drive mechanism 166 actuate arms 154, 156. In other embodiments, the operator may initiate the unloading operation using user input device 182 of the control system 168 of the trolley 152, and controller 120 receives a signal from the control system 168 that the unloading operation has been initiated.

In method step 204, upon initiating the unloading operation, the controller 120 also operates the hydraulic system 60 to lower the base 18 from the frame 12. For example, upon receiving a signal indicating the unloading operation has been initiated, the controller 120 operates the motor 94 of the pump 92 to initiate extending the base 18 from the frame 12.

In method step 206, during the unloading operation, at the first time (t0), the controller 120 determines the first height h(t0) of the cot 10 and the first pressure p(t0) being supported by the cot 10. The controller 120 may determine the first load p(t0) and first height h(t0) in response to the wheels 18*c* of the cot 10 contacting the ground surface. For example, the controller 120 may receive a signal from position sensor 124 to determine the first height, h(t0), as a function of the sensed height from position sensor 124. In another example, the controller 120 may receive a signal from the one or more load sensors 176 indicating the hydraulic pressure being experienced by the hydraulic system 60, and determine the first load, p(t0), as a function of the sensed pressure.

In method step 208, the controller 120 monitors for the trolley load condition and the method continues to 210. At 210, the controller 120 determines whether the trolley unload condition is detected. If so, the method 200 continues to 212; otherwise, the method 200 continues back at 208. The controller 120 may detect the trolley unload condition in response to the arms 154, 156 switching from the engaged configuration to the release configuration. In the engaged configuration, the arms 154, 156 are fully supporting the cot 10 and in the released configuration, the arms 154, 156 are not supporting any portion of the cot 10. The controller 120 may determine whether the trolley unload condition is detected based on a load signal received from the control system. The load signal may correspond to a logic low "0" when the arms 154, 156 in the released configuration and a logic high "1" when the arms 154, 156 are the engaged configuration.

In method step 212, the controller 120 determines, at the second time (t1), the second height h(t1) of the cot 10 and/or second pressure p(t1) being experience by the hydraulic system 60. At method step 214, the controller 120 determines the target lift configuration based on h(t0), p(t0), h(t1), and/or p(t1). The target lift configuration may correspond to a desired cot height h(t2). For example, the controller 120 may determine the desired cot height using Equation (2), $f'(h(t1))+g'(p(t1))\approx h(t2)$, with $f(h=h^*(t1))=0.29^*h$ (Equation (3)) and $g'(p=p(t1))=-0.21^*p-0.09$.

In method step 216, the controller 120 then operates the hydraulic system 60 to achieve the target lift configuration. For example, the controller 120 operates the hydraulic system 60 such that the desired cot height h(t2) is achieved when the locking mechanism 159 moves from the locked configuration to the unlocked configuration to release the pins 157 to avoid the patient or emergency personnel experiencing any discomfort while the cot 10 comes off of the trolley 52. The controller 120 may also be programed to use two pressure transducers to determine the forces applied to the system and calculating the adjustment without a position sensor. In addition, a strain gauge may be used to see the full load of the system, or may be tuned to less than the full load of the system. For example, the strain gauge may be tuned to see up to 250/300 lb for optimum resolution in common use scenarios. Other sensors may also be used to determine the height of the cot 10, including but not limited to sensors based on sound or light waves, optical sensors, string potentiometers, hall effect sensors, rotational potentiometers, etc.

In addition, while two sensors (e.g., the position sensor 124 and the one or more load sensors 176) are utilized by the controller 120 in the representative embodiments described herein, it will be appreciated that the controller 120 could utilize signals from a single sensor (e.g., the one or more load sensors 176 or the position sensor 124) in some embodiments in order to provide at least some adjustment. Furthermore, it will be appreciated that various combinations of sensors, the same or different types (e.g., pressure transducers, position sensors, load cells, strain gauges, and the like), may be utilized in some embodiments. External sensors on the trolley 152 or otherwise may also be used to determine force or just direction of force exerted by the cot 10 in any given direction on the load system.

Further, it should be understood, in each instance above, where it is described that the controller or sensor or other components are in communication, it should be understood that the communication may be achieved through hard wiring or via wireless communication.

Further, although illustrated as discrete separate components, the various components may be assembled or integrated together into a single unit or multiple units.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

It will be further appreciated that the terms “include,” “includes,” and “including” have the same meaning as the terms “comprise,” “comprises,” and “comprising.” Moreover, it will be appreciated that terms such as “first,” “second,” “third,” and the like are used herein to differentiate certain structural features and components for the non-limiting, illustrative purposes of clarity and consistency.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A system for use in removably loading a patient transport apparatus into an emergency vehicle, the system comprising:

- a loading and unloading system for attaching to the emergency vehicle, the loading and unloading system including a receiver; and
- a patient transport apparatus configured for releasable attachment to the loading and unloading system, the patient transport apparatus including:
  - a base supporting a wheel for engagement with a ground surface,
  - a litter defining a patient support surface to support a patient,
  - a lift mechanism to facilitate arranging the litter at different heights relative to the base with an actuator movable between a plurality of lift configurations including a fully-retracted configuration and a fully-extended configuration,
  - a coupler operatively attached to the litter for releasably engaging the receiver of the loading and unloading system to secure the patient transport apparatus to the loading and unloading system,
  - a first sensor configured to output a first signal indicative of a height of the litter relative to the base,
  - a second sensor configured to output a second signal indicative of applied force occurring between the base and the litter, and
  - a controller in communication with the actuator of the lift mechanism, the first sensor, and the second sensor, the controller being configured to determine a target lift configuration during unloading from the emergency vehicle as the actuator moves toward the fully-extended configuration, the target lift configuration being defined to inhibit compressing the patient transport apparatus between the wheel engaging the ground surface and the coupler engaging the receiver based on:
    - a first value associated with at least one of the first signal and the second signal determined in response to contact of the wheel occurring with the ground surface; and
    - a second value associated with at least one of the first signal and the second signal determined in response to the patient transport apparatus at least partially moving out of support from at least a portion of the loading and unloading system; and
  - the controller being further configured to drive the actuator to the target lift configuration defined based on the first value and the second value to facilitate unloading the patient transport apparatus supported on the ground surface in an uncompressed state to limit relative movement between the patient transport apparatus and the loading and unloading system as the coupler and the receiver disengage to release the patient transport apparatus from the loading and unloading system.

2. The system of claim 1, wherein the loading and unloading system includes a track for mounting to the emergency vehicle, and a trolley slidably mounted to the track.

3. The system of claim 2, wherein receiver is operatively attached to the trolley.

4. The system of claim 2, wherein the trolley includes an arm movable between:

- an engaged configuration in which the arm is supporting the patient transport apparatus, and
- a released configuration in which the arm in not supporting the patient transport apparatus.

5. The system of claim 4, wherein the trolley includes an arm sensor configured to output an arm signal indicative of whether the arm is in the engaged configuration or the released configuration.

6. The system of claim 5, wherein the controller determines the target lift configuration in response to output of the arm signal indicating that the arm has moved from the engaged configuration to the released configuration.

7. The system of claim 1, wherein the actuator defines a cylinder supporting a piston coupled to a rod arranged for movement along the cylinder, the lift mechanism further comprising a fluid reservoir and a pump driven by a motor to direct hydraulic fluid from the fluid reservoir to the cylinder, the controller being configured to control a flow of hydraulic fluid between the cylinder and the fluid reservoir.

8. The system of claim 7, wherein the second sensor is a pressure sensor and the second signal output from the second sensor is indicative of a magnitude of pressure of the hydraulic fluid.

9. The system of claim 8, wherein the second signal output from the second sensor is indicative of the magnitude of pressure of the hydraulic fluid at a first end of the cylinder, the system further comprising a pressure sensor configured to output a pressure signal indicative of a magnitude of pressure of the hydraulic fluid at a second end of the cylinder.

10. The system of claim 1 further comprising a strain gauge configured to output a strain signal indicative of engagement of the wheel with the ground surface.

11. The system of claim 1, wherein the coupler comprises at least one pin and the receiver comprises at least one latch, the at least one pin configured to engage with the at least one latch.

12. The system of claim 1, further comprising a user interface with an input control arranged for user engagement to move the receiver between:

a locked configuration engaging the coupler to secure the patient transport apparatus to the loading and unloading system, and an unlocked configuration disengaged from the coupler to release the patient transport apparatus from the loading and unloading system.

13. A patient transport apparatus for use with a loading and unloading system of an emergency vehicle, the loading and unloading system having a receiver, the patient transport apparatus comprising:

a base supporting a wheel for engagement with a ground surface;

a litter defining a patient support surface to support a patient;

a lift mechanism to facilitate arranging the litter at different heights relative to the base with an actuator movable between a plurality of lift configurations including a fully-retracted configuration and a fully-extended configuration;

a coupler operatively attached to the litter for releasably engaging the receiver of the loading and unloading system to secure the patient transport apparatus to the loading and unloading system;

a first sensor configured to output a first signal indicative of a height of the litter relative to the base;

a second sensor configured to output a second signal indicative of applied force occurring between the base and the litter; and a controller in communication with the actuator of the lift mechanism, the first sensor, and the second sensor, the controller being configured to determine a target lift configuration during unloading from the emergency vehicle as the actuator moves toward the fully-extended configuration, the target lift configuration being defined to inhibit compressing the patient transport apparatus between the wheel engaging the ground surface and the coupler engaging the receiver based on:

a first value associated with at least one of the first signal and the second signal determined in response to contact of the wheel occurring with the ground surface; and a second value associated with at least one of the first signal and the second signal determined in response to the patient transport apparatus at least partially moving out of support from at least a portion of the loading and unloading system; and the controller being further configured to drive the actuator to the target lift configuration defined based on the first value and the second value to facilitate unloading the patient transport apparatus supported on the ground surface in an uncompressed state to limit relative movement between the patient transport apparatus and the loading and unloading system as the coupler and the receiver disengage to release the patient transport apparatus from the loading and unloading system.

14. The patient transport apparatus of claim 13, wherein the first value is determined at a first time and the second value is determined at a second time, the second time occurring after the first time.

15. The patient transport apparatus of claim 14, wherein the controller determines the target lift configuration at a third time occurring after the second time.

16. The patient transport apparatus of claim 14, wherein the controller determines the target lift configuration with a transfer function based on the first signal and the second signal.

17. The patient transport apparatus of claim 13, wherein the actuator defines a cylinder supporting a piston coupled to a rod arranged for movement along the cylinder, the lift mechanism further comprising a fluid reservoir and a pump driven by a motor to direct hydraulic fluid from the fluid reservoir to the cylinder, the controller being configured to control a flow of hydraulic fluid between the cylinder and the fluid reservoir.

18. The patient transport apparatus of claim 17, wherein the second sensor is a pressure sensor and the second signal output from the second sensor is indicative of a magnitude of pressure of the hydraulic fluid.

19. The patient transport apparatus of claim 18, wherein the second signal output from the second sensor is indicative of the magnitude of pressure of the hydraulic fluid at a first end of the cylinder, the system further comprising a third sensor configured to output a third signal indicative of a magnitude of pressure of the hydraulic fluid at a second end of the cylinder.

20. The patient transport apparatus of claim 13, further comprising a strain gauge configured to output a strain signal indicative of engagement of the wheel with the ground surface.

* * * * *